Nov. 25, 1958  M. W. CALLEN ET AL  2,861,757
INTERLOCKING APPARATUS FOR RADIO CONTROL OF AIRCRAFT
Filed June 1, 1953  6 Sheets-Sheet 2

INVENTORS
MAX W. CALLEN
THEODORE J. WILSON
BY George H. Fisher
ATTORNEY

Nov. 25, 1958.  M. W. CALLEN ET AL  2,861,757
INTERLOCKING APPARATUS FOR RADIO CONTROL OF AIRCRAFT
Filed June 1, 1953  6 Sheets-Sheet 3

INVENTORS
MAX W. CALLEN
THEODORE J. WILSON
BY
George H. Fisher
ATTORNEY

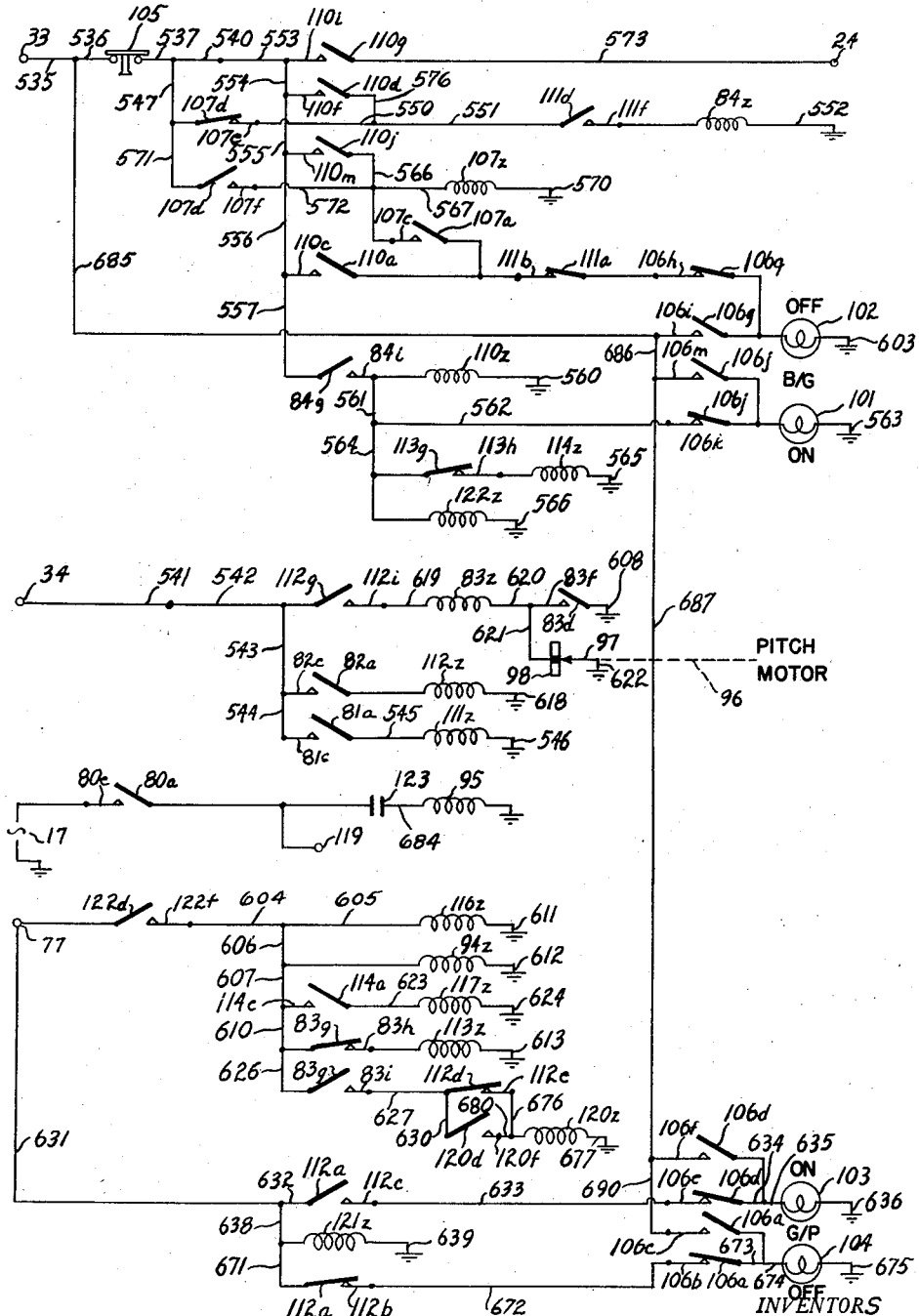

Nov. 25, 1958 M. W. CALLEN ET AL 2,861,757
INTERLOCKING APPARATUS FOR RADIO CONTROL OF AIRCRAFT
Filed June 1, 1953 6 Sheets-Sheet 6

INVENTORS
MAX W. CALLEN
THEODORE J. WILSON
BY
George H Fisher
ATTORNEY

# United States Patent Office 2,861,757
Patented Nov. 25, 1958

2,861,757

INTERLOCKING APPARATUS FOR RADIO CONTROL OF AIRCRAFT

Max W. Callen, St. Paul, and Theodore J. Wilson, Minneapolis, Minn., assignors to Minneapolis-Honeywell Regulator Company, Minneapolis, Minn., a corporation of Delaware Application June 1, 1953, Serial No. 358,684

19 Claims. (Cl. 244—77)

This invention relates to the field of aircraft control apparatus, and more particularly to improved automatic flight control equipment having special characteristics of safety in operation.

The general function of such equipment is to cause the craft to follow a particular course, either in azimuth, with respect to an omnibearing range transmitter, or first in azimuth and then in azimuth and elevation, with respect to the transmitters of an instrument landing system installation. Proper performance of this function requires not only the usual navigating receiver, gyrosyn compass system, and bearing deviation indicator, but an automatic pilot, coupling means for connecting the automatic pilot to the previously listed apparatus, and supervisory means for ensuring that the desired functions of the apparatus as a whole take place in proper sequence, and that no control is attempted unless all components necessary to complete performance of the control are in proper operating condition.

A broad object the invention is accordingly to provide automatic flight control apparatus having safety provisions for preventing improper operation of the apparatus by preventing initiation of such operation and by interrupting operation if it becomes improper.

A more specific object of the invention is to provide such apparatus which includes means to prevent operation of the coupling means referred to above unless the navigating receiver is in operation.

Another object of the invention is to provide such apparatus which includes means to prevent operation of the coupling means unless a channel of the automatic pilot necessary to proper control is engaged.

A specific object of the invention is to provide such apparatus including means to prevent the initiation of azimuth control of the craft through the coupler unless the rudder channel of the automatic pilot is engaged.

Another specific object of the invention is to provide such apparatus including means to prevent the initiation of elevation control of the craft through the coupler unless the elevator channel of the automatic pilot is engaged.

Another general object of the invention is to provide such apparatus including means to prevent elevation control of the craft from being exercised unless azimuth control is also being exercised.

A further object of the invention is to provide such apparatus including means to prevent initiation of azimuth control of the craft through the coupler unless an adequate azimuth signal is being received by the navigating receiver.

A further object of the invention is to provide, in such apparatus, means for preventing control of the craft by the directional gyroscope in the automatic pilot when the control by the coupler is being exercised.

A further object of the invention is to provide such apparatus in which failure of the azimuth signal, after automatic control in accordance therewith has been established, interrupts that control in such a fashion that subsequent return of the azimuth signal does not automatically re-establish the control.

Another object of the invention is to provide such apparatus in which, after automatic azimuth control of the craft in accordance with the azimuth signal of the instrument landing system has ben established, elevation control of the craft is automatically initiated.

Another object of the invention is to provide apparatus as just described including means to automatically initiate elevation control of the craft at a time when the craft is on the desired path in elevation.

Yet another object of the invention is to provide such apparatus in which failure of the elevation error signal, after automatic control of the aircraft in azimuth and elevation from the instrument landing system has been established, results in maintenance of the azimuth control and initiation of elevation control at a fixed pitch attitude, which may be that prevailing before the elevation control of the craft was established, or that prevailing at the time the glide path signal fails.

A still further object of the invention is to provide such apparatus in which failure of the azimuth error signal after automatic control of the aircraft in azimuth and elevation from the instrument landing system has been established, restores normal automatic pilot control of the craft in both azimuth and elevation.

A still further object of the invention is to provide such apparatus in which failure of the azimuth error signal, after automatic control of the aircraft in azimuth and elevation from the instrument landing system has been established, restores normal automatic pilot control of the craft in azimuth and maintains elevation control of the craft from the instrument landing system.

Various other objects, advantages, and features of novelty which characterize our invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which we have illustrated and described certain preferred embodiments of our invention. In the drawing:

Figure 5 illustrates a modification of the invention shown in Figure 1; and

Figure 1:
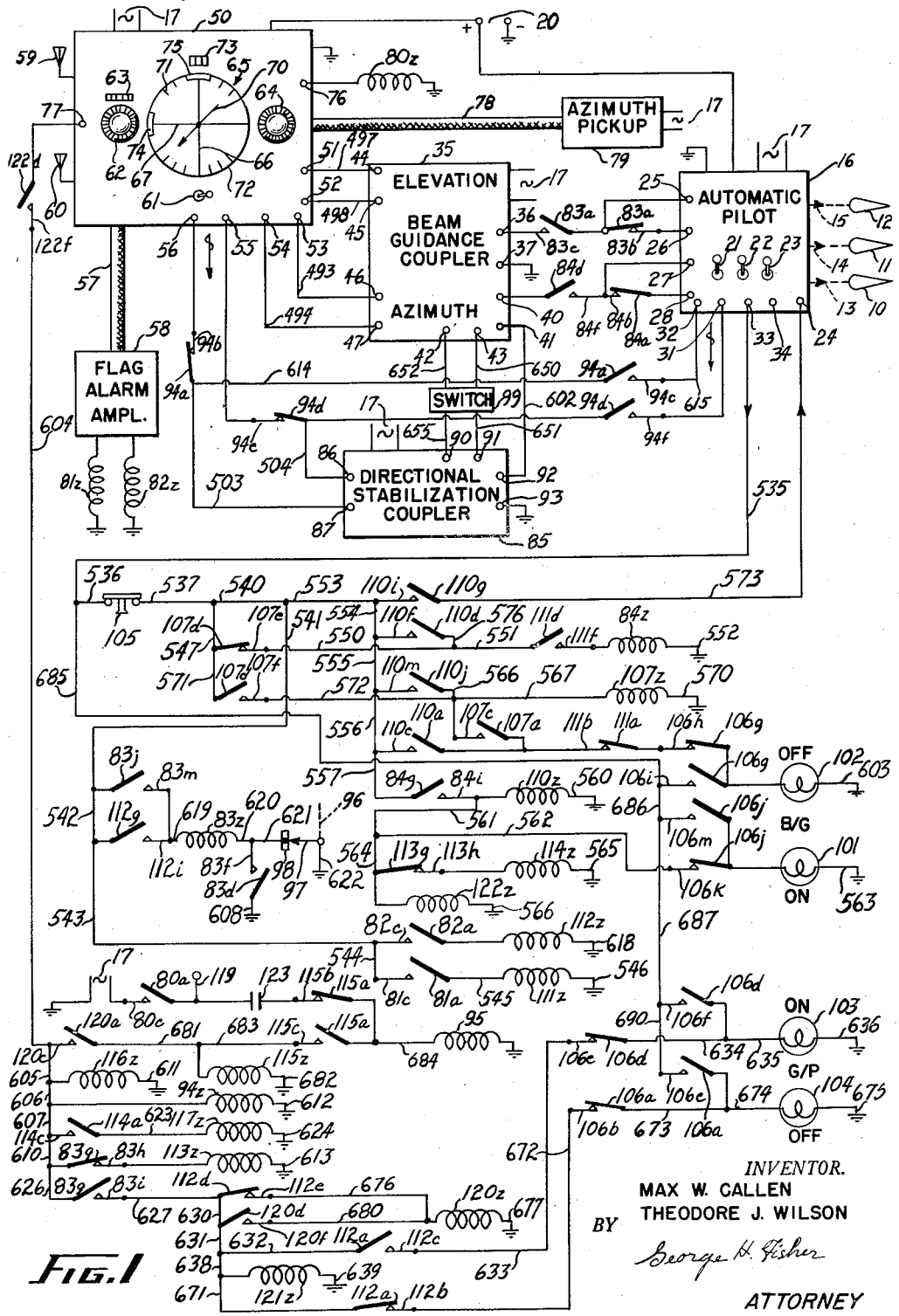
Figure 1 is a general showing of the components making up one embodiment of the invention, together with elements of the supervisory circuits therefor.

Referring now to Figure 1, the apparatus is shown as arranged to operate the rudder 10, ailerons 11, and elevators 12 of the aircraft in which it is installed by mechanical connections 13, 14 and 15 respectively to an automatic pilot 16. The automatic pilot is energized with alternating voltage from a source 17 and with direct voltage from a source 20.

Figure 3:
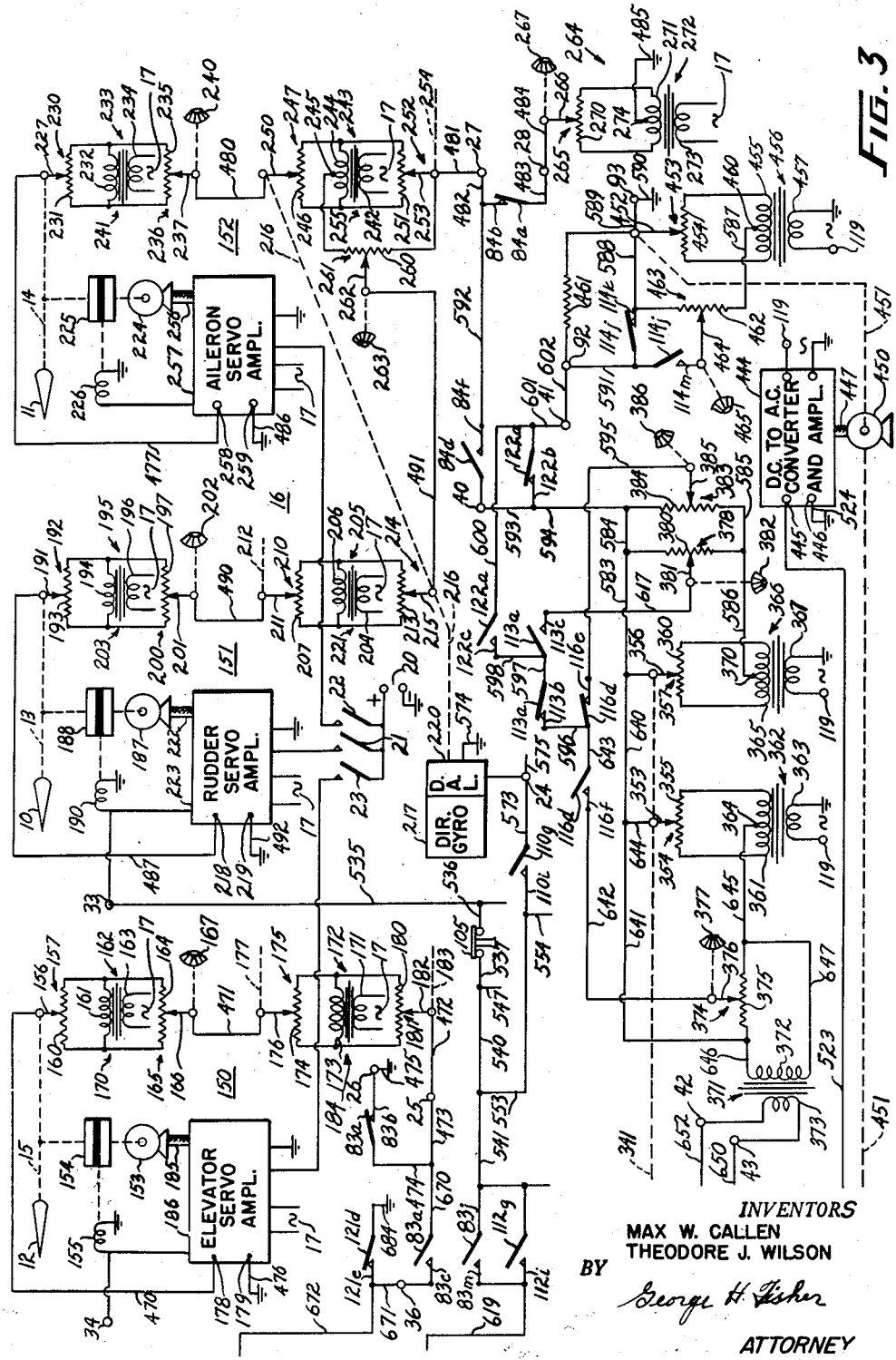

Automatic pilot 16 is made up of rudder, aileron, and elevator channels shown in detail in Figure 3 and separately engageable by operation of switches 21, 22 and 23 respectively to maintain a desired attitude of the craft about each of its axes, under the control of a directional gyroscope, a vertical gyroscope, and other gyroscopic, manual control and condition responsive devices considered desirable to ensure the desired precision of operation. The directional gyroscope includes a directional arm lock whereby its effect on the automatic pilot may be removed when an electrical signal is applied between a terminal 24 and ground.

The nature of automatic pilot 16 is such that it is possible to overpower its normal stabilizing action by the application of suitable signals at terminals 25, 26 and 27, 28 of the automatic pilot, as will be described in more detail in connection with Figures 2 and 3.

Automatic pilot 16 supplies at terminals 31 and 32 an alternating voltage varying as the craft banks: between terminal 33 and ground a direct voltage appears whenever the rudder channel of the autopilot is engaged, and a similar voltage appears between terminal 34 and ground whenever the elevator channel of the automatic pilot is engaged.

In Figure 1, the source of overriding signals for control of automatic pilot 16 is shown to comprise a beam guidance coupler 35 energized from source 17, and having elevation output terminals 36 and 37, azimuth output terminals 40 and 41, and further output terminals 42 and 43. Signals are in turn supplied to elevation input terminals 44 and 45 and azimuth input terminals 46 and 47 of coupler 35 from airborne radio receiving equipment generally indicated by reference character 50. Receiver 50 is energized with alternating voltage from source 17, and is also connected to source 20. The elevation control signals of receiver 50 are supplied at terminals 51 and 52, and the azimuth control signals are similarly supplied at terminals 53 and 54. In addition receiver 50 supplies a signal on a pair of output terminals 55 and 56, and a pair of "flag" signals, for indicating improper operation of the receiver. The latter are transmitted along a cable 57 to a flag alarm amplifier 58 which operates in a manner presently to be described to assist in control of the aircraft.

Receiver 50 is shown to include an azimuth signal antenna 59, a glide path signal antenna 60, a power switch 61, a tuning knob 62 and counter type indicator 63, an azimuth selector knob 64, and a complex indicating instrument 65, including vertical and horizontal cross pointers 66 and 67, a further pointer 70 movable with respect to a pair of fixed scales 71 and 72, a counter type of indicator 73 actuated in accordance with knob 64, and a pair of flag alarms 74 and 75. Switch 61 not only controls the energization of receiver 50, but simultaneously energizes a relay terminal 76 and also connects a terminal 77 to source 20 when the receiver is in operation.

A considerable number of relays are included in the supervisory system making up the present invention, and a convention for identifying their various parts has been established. For convenience in representation in the drawing, whereby maximum understanding of the operation of the system may be obtained, the various contacts and windings of the relays are not shown centered at any particular places in Figures 1, 2, 3 and 5, but are located about the drawing according to the regular principles of flow diagrams. A general showing of all these units in assembled form is given in Figures 6–24. Each relay has been given a reference numeral, and subscripts applied to this numeral represent the components of each relay. The subscript $z$ refers to the winding of the relay, subscripts $a$, $d$, $g$, and $j$ refer to the movable contacts of the relay, subscripts $b$, $e$, $h$, and $k$ refer to contacts of the relay normally engaged by the movable contacts, when the relay winding is deenergized, and subscripts $c$, $f$, $i$, and $m$ refer to contacts of the relay normally disengaged by the movable contacts, when the relay winding is deenergized. When the same movable contact may engage either of two fixed contacts, the movable contact is shown twice. Thus the winding of a power relay energizable by operation of receiver 50 is shown in Figure 1 at 80$z$ and has switching contacts 80$a$ and 80$c$. Similarly flag alarm amplifier 58 is shown to energize azimuth flag pilot relay winding 81$z$ and glide flag pilot relay winding 82$z$, having switching contacts 81$a$, 81$c$ and 82$a$, 82$c$, respectively.

The interconnection between beam guidance coupler 35 and the elevation control channel of automatic pilot 16 includes contacts 83$a$, 83$b$, and 83$c$ of a glide reset relay having a winding 83$z$ and further contacts 83$d$, 83$f$, 83$g$, 83$h$, 83$i$, 83$j$, and 83$m$. Similarly the interconnection between beam guidance coupler 35 and the azimuth control channel of automatic pilot 16 includes a first pair of contacts 84$d$ and 84$f$ and a second pair of contacts 84$b$ and 84$a$ of a solenoid switch which is identified according to the convention described for relays, and which has a winding 84$z$ and further contacts 84$g$ and 84$i$.

Solenoid switch 84 is of the type disclosed in Wilson Patent 2,525,846, in which operation of the switching contacts is brought about by a manual operator under the control of a solenoid actuated latch. The manual operator is normally prevented by the latch from changing the contact positions but if the solenoid is energized, the latch is displaced and manual operation of the contacts may take place, means being provided to retain the switch in operated position or in normal position under this manual operation. If the solenoid is deenergized while the switch is in its operated position, the latch causes the switch to return to its normal position and once more locks it there. Full details of the structure of this solenoid switch mechanism are given in the patent above identified, and the elements involved are suggested in Figure 6.

As described in more detail in the copending application of Theodore J. Wilson, Serial No. 324,465, filed December 6, 1952, and assigned to the assignee of the present application, receiver 50 requires an input determined by the heading of the craft, suggested in Figure 1 by cable 78 and pickup unit 79. The means for accomplishing this will be discussed specifically in connection with Figure 2.

Also included in the apparatus is a directional stabilization coupler 85 which is energized with alternating voltage from source 17. Coupler 85 has a first pair of input terminals 86 and 87, a second pair of input terminals 90 and 91, and a pair of output terminals 92 and 93.

Coupler 85 is energized at terminals 86 and 87 with alternating signal voltage either from receiver 50 or from the vertical gyroscope in automatic pilot 16, according to the position of a plurality of contacts 94$a$, 94$b$, 94$c$, 94$d$, 94$e$, and 94$f$ of a direction changeover relay 94 having a winding 94$z$. In the condition shown in Figure 1, directional stabilizing coupler 85 is energized from receiver 50.

Coupler 85 is additionally energized at terminals 90 and 91 with alternating signal voltage from terminals 42 and 43 of coupler 35, through a switching arrangement 99 which will be described more fully below.

In the lower central portion of Figure 1 there is shown the line phase winding 95 of a pitch motor in beam guidance coupler 35, which for clarity of explanation has been separated from the rest of the coupler. The output connection 96 of that motor is shown separately as adjusting a moveable contact 97 with respect to a fixed contact 98, for reasons which will be set forth in more detail below.

In the lower right hand portion of Figure 1 is shown a plurality of indicator lamps 101, 102, 103 and 104. These lamps, like the remaining elements not yet described in Figure 1, comprise a portion of the supervisory or interlocking arrangement whereby proper operation of the system as a whole is maintained. Lamp 101 is illuminated when the beam guidance system is turned on. Lamp 102 is illuminated if the guidance beam fails after the beam guidance system has been turned on. Lamp 103 is illuminated when the glide path control portion of the apparatus is in operation, and lamp 104 is illuminated if the glide path signal fails after the glide path control portion of the apparatus has been in operation.

The supervisory apparatus further includes a normally closed momentarily operable switch 105 shown in the left central portion of the figure, and a four pole double throw lamp test switch 106 which has no winding, but which is manually operable out of a normal position, to which it returns when the manual force is removed. Switch 106 includes contacts 106a, 106b, 106c, 106d, 106e, 106f, 106g, 106h, 106i, 106j, 106k, and 106m.

A reset relay 107 is shown to include a winding 107z and a plurality of switching contacts 107a, 107c, 107d, 107e, and 107f. An engage relay 110 is shown to comprise a winding 110z and a plurality of switching contacts 110a, 110c, 110d, 110f, 110g, 110i, 110j, and 110m. An azimuth flag relay 111 is shown to comprise a winding 111z and a plurality of switching contacts 111a, 111b, 111d and 111f. A glide flag relay 112 is shown to comprise a winding 112z and a plurality of switching contacts 112a, 112b, 112c, 112d, 112e, 112g, and 112i.

A localizer only relay 113 is shown to comprise a winding 113z and switching contacts 113g and 113h. A directional output relay 114 is shown to comprise a winding 114z and switching contacts 114a and 114c. A pitch lock relay 115 is shown to comprise a winding 115z and a plurality of switching contacts 115a, 115b, and 115c. An "omni" relay 116 is shown to comprise a winding 116z. A direction input relay 117 is shown to comprise a winding 117z. A glide failure relay 120 is shown to comprise a winding 120z and a plurality of switching contacts 120a, 120c, 120d, and 120f. A glide path only relay 121 is shown to comprise a winding 121z. As azimuth output relay 122 is shown to have a winding 122z and a pair of contacts 122d and 122f.

It should be pointed out that in the above description of the relays included in the supervisory apparatus only those switching contacts are mentioned which appear on Figure 1. Further switching contacts appearing in subsequent figures will be identified when reference is made to those figures.

For completeness of illustration and convenience of reference, Figures 6–24 are presented to show the construction of switches 84 and 106 and relays 83, 122, 110, 114, 112, 113, 117, 121, 94, 107, 111, 116, 120, 80, 81, 82, and 115, respectively In addition to the components above described, Figure 1 also shows a terminal 119, and a capacitor 123 which cooperates with the line phase winding of the pitch motor of beam guidance coupler 35 to give the desired phase shift necessary for proper operation of the motor.

Figure 2:
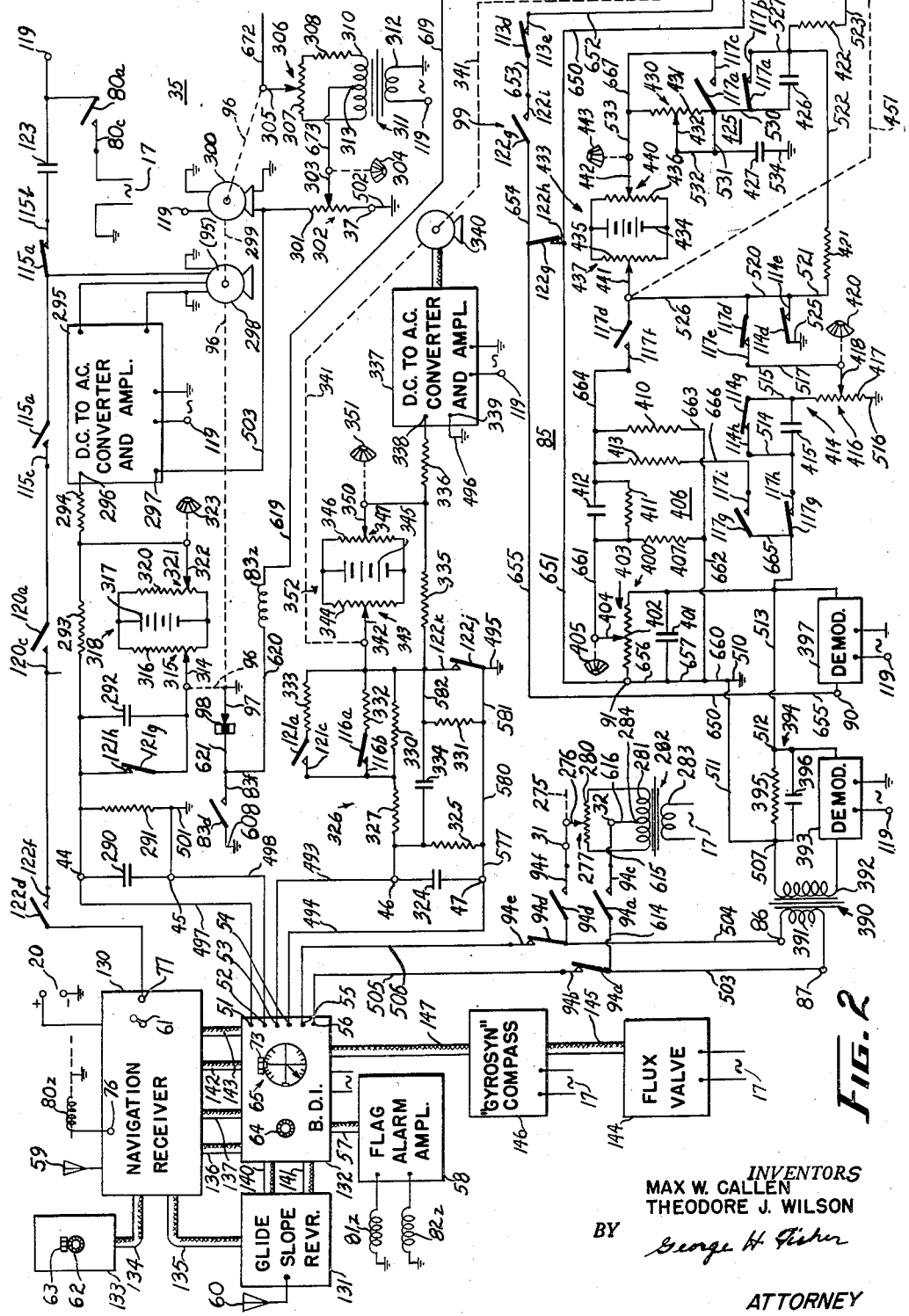
Figures 2 and 3 are a more detailed specific showing of portions of this modification of the invention.

Reference should now be made to Figures 2 and 3, which give much greater detail with respect to the components of the invention shown in the upper half of Figure 1; the supervisory apparatus shown in the lower part of Figure 1 is in complete detail, and is therefore not repeated in Figures 2 and 3.

Airborne radio apparatus 50 of Figure 1 is shown in Figure 2 to include a navigation receiver 130, a glide slope receiver 131, and a bearing deviation indicator 132. By means of antenna 59 receiver 130 responds to the signals from an omnibearing range transmitter or from the localizer transmitter of an instrument landing system, while glide slope receiver 131 responds to the glide slope signals of an instument landing system transmitter by means of antenna 60. A frequency control unit 133 is shown to include tuning knob 62, and is connected with navigation receiver 130 by cable 134 and further with glide slope receiver 131 by cable 135. Adjustment of tuning knob 62 is effective to simultaneously tune one or both receivers according as the tuning is within the range of frequencies allotted to the omnibearing transmitters or within the range allotted to the instrument landing system transmitters. These components are commercially available and well known devices, and details of their structure are not pertinent to the present invention.

Whenever switch 61 is closed to put the navigation receiver 130 in operation, unidirectional voltage from source 20 is supplied to relay winding 80z. Whenever thereafter tuning knob 62 is set to a frequency within the range of the instrument landing system transmitters, unidirectional voltage from source 20 appears at output terminal 77 of receiver 130.

Bearing deviation indicator 132 includes indicator 65 itself and selector knob 64. As long as navigation receiver 130 is receiving a reliable signal, it supplies a flag signal on a cable 136 to indicator 65, and it also supplies on cable 137 a signal determined by the displacement of the aircraft from the desired localizer or omni beam. Similarly, as long as glide slope receiver 131 is receiving an adequate signal it supplies on cable 140 a flag signal to indicator 65, and it also supplies on cable 141 a signal to indicator 65 proportional to the displacement of the craft from the glide path beam. Knob 64 actuates counter indicator 73, and also operates as a phase shifter to adjust the operation of receiver 130 during the intervals when it is tuned to omnibearing frequencies. The connections between receiver 130 and knob 64 through which this phase shift adjustment takes place include cables 142 and 143, and are described in more complete detail in the copending application referred to previously.

As described in connection with Figure 1, the flag signals supplied by receivers 130 and 131 to bearing deviation indicator 132 are conducted by cable 57 to flag alarm amplifier 58, so that when the flag signals indicate that the radio signals received by the receivers are of acceptable magnitude, relays 81 and 82 are energized.

The azimuth pickup used in Figure 1 is shown in Figure 2 to comprise a flux valve 144 energized from source 17 and connected by a cable 145 to a gyrosyn compass 146, the latter being connected to bearing deviation indicator 132 through cable 147. This structure is also more completely described in the copending application previously referred to.

Automatic pilot 16 of Figure 1 is shown in Figure 3 to comprise elevator, rudder, and aileron control channels 150, 151, and 152 respectively. Since refinements of the automatic pilot comprise no portion of the present invention, each channel of the automatic pilot has been presented in highly simplified form. Thus in the upper left hand corner of Figure 3, the elevators 12 of the craft are shown as being actuated by an elevator servomotor 153 through mechanical connection 15 which includes a clutch 154 having an operating solenoid 155. Normally clutch 154 is disengaged, allowing free operation of elevators 12 by the control stick in the aircraft, not shown: when the elevator channel of the automatic pilot is engaged, motor 153 and solenoid 155 are simultaneously energized, so that operation of the motor is mechanically transmitted to elevators 12 to adjust their position. Mechanical connection 15 is extended to operate the slider 156 of a voltage divider 157 whose resistance element 160 is energized from the secondary winding 161 of a transformer 162, the primary winding 163 of which is energized from source 17. Also energized from secondary winding 161 is the resistance element 164 of a voltage divider 165 whose slider 166 is actuable by a manual pitch trim adjusting knob 167. The structure just described comprises a bridge circuit indicated by the general reference numeral 170.

There is also energized from source 17 the primary winding 171 of a transformer 172 whose secondary winding 173 energizes the resistance element 174 of a voltage divider 175 having a slider 176 mechanically actuated by a suitable linkage 177 to the roll output of a vertical gyroscope, not shown, carried by the aircraft, to provide an up-elevator signal when the craft banks. Secondary winding 173 also energizes the resistance element 180 of a voltage divider 181 whose slider 182 is actuated by a mechanical connection 183 to the pitch axis of the aircraft's vertical gyroscope. The structure just described comprises a bridge circuit indicated by the general reference numeral 184.

Motor 153 is energized through a cable 185 under the control of an elevator servo amplifier 186, the energy for driving the motor being supplied by source 20 through switch 23. The same circuit supplies energization to solenoid 155, and whenever this solenoid is energized, by engagement of the elevator control channel of the automatic pilot, voltage appears on terminal 34. Amplifier 186 is supplied with an input at input terminals 178 and 179 in accordance with the outputs of bridge circuits 170 and 184.

Also effective in the elevator channel of the automatic pilot as shown in Figure 3, are relay contacts 83a, 83b, and 83c of Figure 1 and a further pair of relay contacts 121d and 121e.

Referring now to rudder control channel 151 of the automatic pilot, the rudder 10 of the aircraft is shown as being actuated by a rudder servomotor 187 through mechanical connection 13 which may include a clutch 188 having an operating solenoid 190, the arrangement being the same as that in elevator control channel 150. Mechanical connection 13 is extended to actuate the slider 191 of a voltage divider 192 whose resistance element 193 is energized from the secondary winding 194 of a transformer 195, the primary winding 196 of which is energized from source 17. Secondary winding 194 also energizes the resistance element 197 of a voltage divider 200 whose slider 201 is actuated by a manual yaw trim knob 202. The structure just described comprises a bridge circuit indicated by the general reference numeral 203.

Also energized from source 17 is the primary winding 204 of a transformer 205 whose secondary winding 206 energizes the resistance element 207 of a voltage divider 210 whose slider 211 is actuated through a mechanical connection 212 by a yaw rate gyroscope, not shown, carried by the aircraft. Secondary winding 206 also energizes a winding 213 of a voltage divider 214 whose slider 215 is actuated through a mechanical connection 216 by the directional gyroscope 217 of the aircraft. The connection to directional gyroscope 217 is made through directional arm lock 220, which functions when electrically energized at terminal 24 to prevent adjustment of connection 216 by directional gyroscope 217. Voltage dividers 210 and 214 and transformer 205 comprise a bridge circuit indicated by the general reference numeral 221.

Motor 187 is energized through a cable 222 from a rudder servo amplifier 223, electrical energy for this purpose being supplied from source 20 through switch 21. Whenever motor 187 is energized, solenoid 190 of clutch 188 is also energized, and terminal 33 is simultaneously energized. Amplifier 223 is supplied with an input at terminals 218 and 219 in accordance with the outputs of bridge circuits 203 and 221.

Referring now to the aileron control channel of automatic pilot 16, the ailerons 11 of the aircraft are shown as being actuated by an aileron servomotor 224 through mechanical connection 14 which includes a clutch 225 like clutch 154, having a solenoid 226. Mechanical connection 14 is extended to actuate the slider 227 of a voltage divider 230 whose resistance element 231 is energized from the secondary winding 232 of a transformer 233, the primary winding 234 of which is energized from source 17. Secondary winding 232 also energizes the resistance element 235 of a voltage divider 236 whose slider 230 is adjustable by a manual roll trim knob 240. The structure just described comprises a bridge circuit indicated by the general reference numeral 241.

Also energized from source 17 is a primary winding 242 of a transformer 243 having a secondary winding 244 center tapped at 245. Winding 244 energizes the resistance element 246 of a voltage divider 247 whose slider 250 is actuated, through an extension of mechanical connection 216, by directional gyroscope 217. Also energized from secondary winding 244 is the resistance element 251 of a voltage divider 252 whose slider 253 is actuated through a mechanical connection 254 by the roll output of the aircraft's vertical gyroscope. Voltage dividers 247 and 252 and transformer 243 comprise a bridge circuit indicated by the general reference numeral 255.

Motor 224 is energized through a cable 256 from an aileron servo amplifier 257, electrical energy for this purpose being supplied by source 20 through switch 22. Solenoid 226 is energized simultaneously with motor 224. Amplifier 257 is supplied with an input at terminals 258 and 259 in accordance with the outputs of bridge circiuts 241 and 255.

Connected between center tap 245 and slider 253 is the resistance element 260 of a voltage divider 261 whose slider 262 is actuated by a manual ratio control knob 263.

Common to the aileron and rudder control channels of the automatic pilot is a turn control circuit 264 shown to comprise a voltage divider 265 having a slider 266 actuated by a manual turn control knob 267 and a resistance element 270 energized from the secondary winding 271 of a transformer 272, the primary winding 273 of which is energized from source 17. Secondary winding 271 is center tapped at 274.

There is shown in the left central portion of Figure 2 a further mechanical connection 275 to the pitch axis output of the vertical gyroscope of the aircraft, by means of which the slider 276 of a voltage divider 277 is adjusted with respect to a resistance element 280 energized from the secondary winding 281 of a transformer 282, the primary winding 283 of which is energized from source 17: secondary winding 281 is center tapped at 284.

The elevation control channel of beam guidance coupler 35 is shown in Figure 2 to include a filter capacitor 290, an input resistor 291, switching contacts 121h and 121g of relay 121, a reset capacitor 292, a voltage dropping resistor 293, an isolating resistor 294, and a D. C. to A. C. converter and amplifier 295 having input terminals 296 and 297 and energized with alternating voltage at a terminal 119, and a pitch motor 298.

Motor 298 drives, through mechanical connection 96, a "velocity generator" or dynamic transformer 300, which is a well known device having primary and secondary windings and a rotor. If the primary winding is energized at terminal 119 with alternating voltage, a voltage appears in the secondary winding which varies in amplitude and reverses in phase with variation in the speed and reversal in the direction of rotation of the rotor; the frequency of the secondary voltage is the same as that of the primary voltage.

The output of velocity generator 300 appears across the resistance element 301 of a voltage divider 302 whose slider 303 is adjustable by a ratio knob 304.

Mechanical connection 96 is extended to operate the slider 305 of an output voltage divider 306 whose resistance element 307 is energized through a resistor 308 from the secondary winding 310 of a transformer 311, the primary winding 312 of which is connected to terminal 119. Secondary winding 310 is center tapped at 313.

Mechanical connection 96 is extended, as described above, to operate movable contact 97 with respect to fixed contact 98, and also to adjust the slider 314 of a balancing voltage divider 315 whose resistance element 316 is energized from a source 317 of unidirectional voltage. Also energized from source 317 is the resistance element 320 of a centering voltage divider 321 whose slider 322 is actuated by a centering knob 323. Voltage dividers 315 and 321 and source 317 comprise a bridge circuit indicated by the general reference numeral 318.

Sliders 305 and 314 are set on shaft 96 so that both are at the centers of their resistance elements at the same time. Resistor 308 is connected in series with resistance element 307 so that the electrical center of the combination, where there is zero output voltage between slider 305 and center tap 313, is not the mechanical center of resistance element 307. When slider 305 is at the center of resistance element 307 the voltage between the slider and center tap 313 is chosen, by proper selection of the output voltage of transformer 311, to have a particular value later to be defined. Contact 97 is set on shaft 96 so that it engages contact 98 when slider 305 and tap 313 are at the same potential.

The azimuth control channel of beam guidance coupler 35 is shown in Figure 2 to comprise a filter condenser 324, an input resistor 325, a rate network 326 including resistors 327, 330, 331, 332 and 333, capacitor 334, and relay contacts 121a, 121c, 116a, 116b, and 122j and 122k. The azimuth control channel also includes a dropping resistor 335, an isolating resistor 336, a D. C. to A. C. converter and amplifier 337 energized from terminal 119 and having input terminals 338 and 339, and an azimuth motor 340 which actuates, through a mechanical connection 341, the slider 342 of a balancing voltage divider 343 whose resistance element 344 is energized from a source 345 of unidirectional voltage. This source also energizes the resistance element 346 of a centering voltage divider 347 whose slider 350 is actuated by a manual centering knob 351. Voltage dividers 343 and 347 and source 345 comprise a bridge circuit indicated by the general reference numeral 352.

Mechanical connection 341 is extended as shown in Figure 3 to operate the slider 353 of a voltage divider 354 having a resistance element 355 and the slider 356 of a voltage divider 357 having a resistance element 360. Resistance element 355 is energized from the secondary winding 361 of a transformer 362, the primary winding 363 of which is energized from terminal 119: secondary winding 361 is center tapped at 364. Similarly resistance element 360 of voltage divider 357 is energized from the secondary winding 365 of a transformer 366, the primary winding 367 of which is energized from terminal 119: secondary winding 365 is center tapped at 370.

Sliders 342, 353 and 356 are fastened to shaft 341 in such a manner that they all contact the centers of their respective windings in the same rotated position of the shaft.

The output circuit of the azimuth control channel of beam guidance coupler 35 further includes a transformer 371 having a primary winding 372 and a secondary winding 373, a first voltage divider 374 having a resistance element 375 and a slider 376 actuated by a manual knob 377, a second voltage divider 378 having a resistance element 380 and a slider 381 actuated by a mechanical knob 382, a third voltage divider 383 having a resistance element 384 and a slider 385 actuated by a mechanical knob 386, and relay contacts 116f, 116d, 116e, 113b, 113a, 113c, 122c, 122a, 122b, 84d, 84f, 84b, and 84a.

Directional stabilization coupler 85 of Figure 1 is shown in Figure 2 to comprise a transformer 390 having a primary winding 391 and a secondary winding 392, a first demodulator 393 energized from terminal 119 and having an output filter 394 including a capacitor 396 and a load resistor 395, a second demodulator 397 also energized from terminal 119 and having an output filter 400 including a capacitor 401 and the resistance element 402 of a voltage divider 403 whose slider 404 is adjusted by a manual knob 405, a pi-section rate network including an input resistor 407 and an output resistor 410 joined by the parallel combination of a resistor 411 and a capacitor 412, a summing resistor 413, a high pass filter 414 including a capacitor 415 and a voltage divider 416 having a resistance element 417 and a slider 418 adjustable by a manual knob 420, dropping resistor 421, isolating resistor 422, a network 425 including capacitors 426 and 427 and a voltage divider 430 having a resistance element 431 and a slider 432, and a bridge circuit 433 including a source 434 of unidirectional voltage energizing the respective resistance elements 435 and 436 of a balancing voltage divider 437 and a centering voltage divider 440, having sliders 441 and 442, respectively, the latter slider being operable by a centering knob 443.

Associated with the components just enumerated are relay contacts 117a, 117b, 117c, 117d, 117e, 117f, 117g, 117h, 117i, 114d, 114e, 114g and 114h.

The directional stabilization coupler is also shown in Figure 3 to include a D. C. to A. C. converter and amplifier 444 energized from terminal 119 and having input terminals 445 and 446, which energizes through a cable 447, a motor 450 which drives through mechanical connection 451 the slider 452 of an output voltage divider 453 whose resistance element 454 is energized from the secondary winding 455 of a transformer 456, the primary winding 457 of which is energized from terminal 119. Secondary winding 455 is center tapped at 460.

The output circuit of the directional stabilization coupler includes a fixed resistor 461, the resistance element 462 of a voltage divider 463 whose slider 464 is adjustable by a manual knob 465, and relay contacts 114j, 114k and 114m.

Mechanical connection 451 is extended as shown in Figure 2 to actuate the slider 441 of balance voltage divider 437. Sliders 441 and 452 are fixed to shaft 451 so that they contact the centers of their respective windings at the same position of shaft 451.

Figure 4:
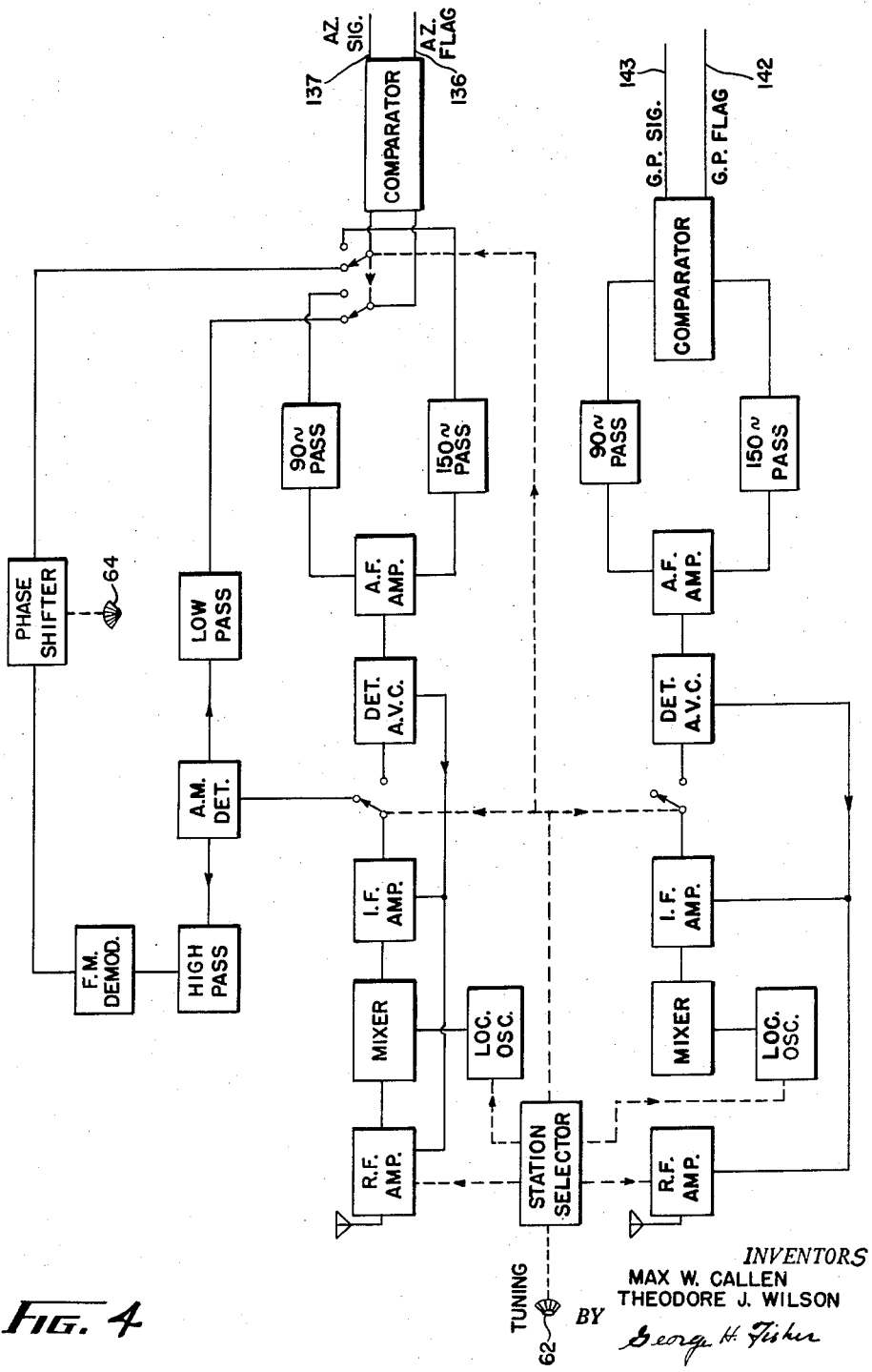
Figure 4 is a block diagram illustrative of the functions of certain portions of Figures 1, 2 and 3.
Figures 7, 8, 9, 10, 11:
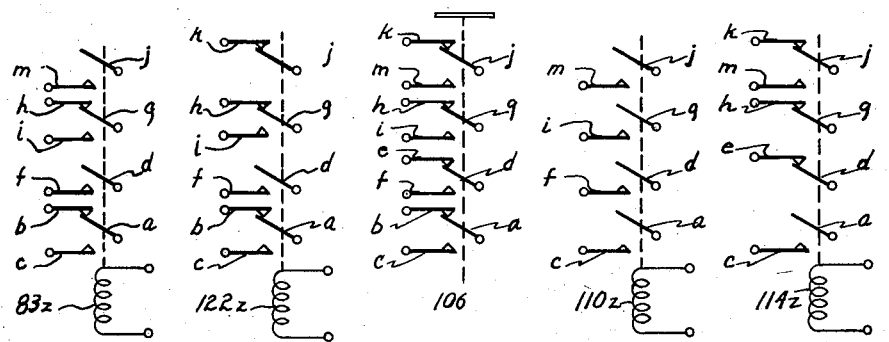
Figures 6–24 show the structure of various switches included in the apparatus.
Figures 6, 12, 13, 14, 15:
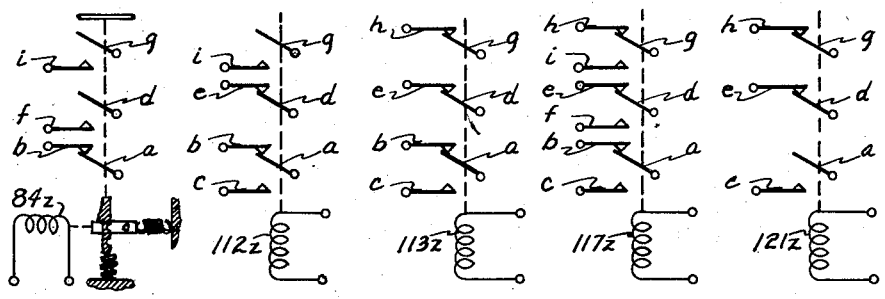
Figures 16, 17, 18, 19, 20:
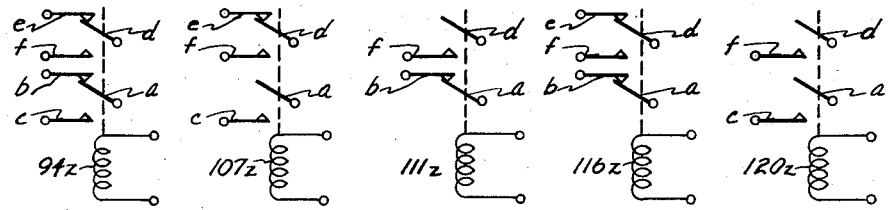
Figures 21, 22, 23, 24:
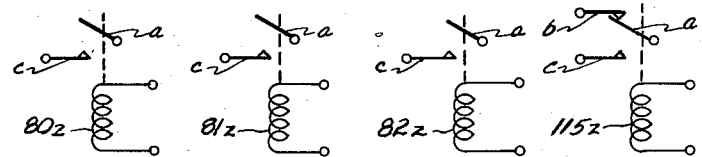

Before describing the operation of the system a brief reference should be made to Figure 4. This figure has been added to the application for the sake of completeness only, and it illustrates in block diagram form the nature and operation of the airborne radio apparatus together with the phase shifter actuated by knob 64. It is believed that the figure is self-explanatory, and needs no further detailed description.

*Operation*

The operation of the apparatus will now be described, and for that purpose it is assumed that the craft is in straight, level flight on a desired heading, under the control of automatic pilot 16, and that this condition has prevailed for a sufficient interval so that transient effects have subsided. Switch 61 is open, but switches 21, 22, and 23 are closed. Relays 80, 81, 82, 83, 94, 107, 110, 111–117, 120, 121, and 122 are in the positions shown, as are switches 105 and 106 and solenoid switch 84. Turn control 267 is centered, and slider 262 is at an optimum position along winding 260 determined by considerations having no bearing on the present invention. Alternating voltage from source 17 is supplied to radio equipment 50, automatic pilot 16, compass 146, flux valve 144, relay contact 80c, primary windings 163, 171, 196, 204, 234, 242, 273, and 283, and the rotors of the vertical, directional, and yaw rate gyroscopes are at rated speed. Direct voltage from source 20 is supplied to radio equipment 50 and switches 21, 22 and 23 of automatic pilot 16.

Consider first the elevator channel 150 of automatic pilot 16. The input circuit for elevator servo amplifier 186 may be traced from terminal 178 through conductor 470, bridge 170, conductor 471, bridge 184, conductor 472, terminal 25, conductors 473 and 474, relay contacts 83a and 83b, terminal 26, and ground connections 475 and 476 to amplifier terminal 179. Motor 153 is not operating, as the craft is in stable flight, so the input to amplifier 186 is zero. Slider 176 is centered, because the craft is not banked; slider 156 is at a position on resistance element 160 determined by the position of elevators 12 required to maintain the present pitch attitude of the craft, which in turn governs slider 182 through the pitch axis of the vertical gyroscope, and slider 166 has been set so that the unbalance signal from bridge 170 is equal and opposite to that from bridge 184.

Now in the aileron channel 152 of automatic pilot 16, the input circuit for aileron servo amplifier 257 may be traced from terminal 258 through conductor 477, bridge 241, conductor 480, bridge 255, conductor 481, terminal 27, conductor 482, relay contacts 84b and 84a, conductor 483, terminal 28, conductor 484, turn control network 264, and the ground connections 485 and 486 to amplifier terminal 259. The craft is not banked, so slider 253 is at the center of resistance element 251, and slider 227 is at the center of resistance element 231. Since the heading of the craft is that desired, slider 250 is at the center of resistance element 246, and slider 266 has been centered on resistance element 270 by centering the turn control. Motor 224 is not operating, as the craft is in stable flight, so the input to aileron servo amplifier 257 is zero; this can only come about, under the conditions just recited, if slider 237 has also been set at the center of its resistance element 235.

In the rudder channel 151 of the automatic pilot the input circuit for rudder servo amplifier 223 may be traced from terminal 218 through conductor 487, bridge 293, conductor 490, bridge 221, conductor 491, slider 262, the portion of resistance element 260 below the slider, conductor 481, terminal 27, conductor 482, relay contacts 84b and 84a, conductor 483, terminal 28, conductor 484, turn control network 264, and ground connections 485 and 492. The craft is not turning and is on the desired heading, so sliders 211 and 215 are centered, and slider 191 is centered because rudder 10 is streamlined. Slider 253 is centered as pointed out above, so no signal appears between slider 262 and slider 253. Motor 187 is not operating, so the input to rudder servo amplifier 223 is zero; this can only come about if slider 291 has also been set at the center of its winding.

Any departure of the attitude of the craft from that just described, about any of its axes, results in gyro-controlled displacement of one or more sliders along the associated winding or windings. By this action the balance of one or more bridges is disturbed, and the appropriate servomotor operation to correct the departure of the craft occurs. Note that if the craft banks, the full bank signal caused by displacement of slider 253 with respect to resistance element 251 appears in aileron channel 152 but only the portion thereof determined by the setting of slider 260 appears in rudder channel 151. Slider 262 is initially adjusted so that any turns made by the aircraft under the control of the automatic pilot are coordinated ones.

The foregoing description of automatic pilot 16 has been reduced to very simple terms since the automatic pilot per se is not the subject matter of the present application, and since such automatic pilots are well known.

For the sake of further simplification, it will be assumed that the heaters of all electron discharge devices in receivers 130 and 131, amplifiers 58, 186, 223, 257, 295, 337, and 444, demodulators 393 and 397, and Gyrosyn compass 146 are at stable operating temperature, and that the compass gyroscope has reached operating speed.

When this condition prevails, pointer 70 of the bearing deviation indicator takes a position within a range of 360° determined by the actual heading of the craft and by the setting of knob 64; if the latter is assumed to be set at zero, as indicated by counter 73, pointer 70 indicates the heading of the craft directly.

Now assume that the craft is about to enter the service area of an omnibearing transmitter operating at a frequency known to the human pilot of the aircraft. He operates frequency control 133 to tune receiver 130 to the desired frequency, and closes switch 61, thus energizing both receivers and pulling in relay 80. Relay contacts 80a and 80c engage, supplying alternating voltage from source 17 to terminal 119 and, through capacitor 123 and relay contacts 115b and 115a, to line phase winding 95 of pitch motor 298. As shown in Figures 2 and 3, terminal 119 supplies alternating voltage as follows: in the elevation control portion of the beam guidance coupler, to amplifier 295, transformer primary 312, and the primary winding of velocity generator 300; in the azimuth control portion of the beam guidance coupler, to amplifier 337 and transformer primaries 363 and 367; and in the directional stabilization coupler, to demodulators 393 and 397, amplifier 444, and transformer primary 457.

As long as the craft is outside the service area of the transmitter no signals are supplied on cables 136 and 137: azimuth flag 75 indicates that the apparatus is not in operation, and no signal appears on terminals 53 and 54, the latter being connected to input terminals 46 and 47 of beam guidance coupler 35 by conductors 493 and 494.

The input circuit for amplifier 337 may be traced in Figure 2 from input terminal 338 through resistors 336 and 335, relay contacts 122k and 122j and ground connections 495 and 496 to terminal 339 of the amplifier. By this circuit there is impressed on the amplifier the unbalance voltage of bridge 352, which appears across resistor 335. If this voltage is zero, amplifier 337 supplies no output and motor 340 remains stationary. The bridge output is zero when sliders 342 and 350 divide their respective resistance elements in the same proportion. It is desired that the outputs from sliders 353 and 356 be zero when the input on terminals 46 and 47 is zero. This is accomplished by initially adjusting slider 350 to supply a bridge output signal and cause operation of motor 340 until the bridge output and the outputs from voltage dividers 354 and 357 of Figure 3 are zero at the same time. If voltage dividers 343 and 347 are linear, slider 350 is then at the center of its winding.

Glide slope receiver 131 is turned on at the same time as navigation receiver 130 by operation of switch 61, but since the craft is not yet within the service area of a glide slope transmitter, and since in any case the receiver has not been tuned to a frequency within the range allocated to glide slope transmitters, no signals are supplied on cables 142 and 143. Glide slope flag 74 indicates that the apparatus is not in operation, and no signal appears on terminals 51 and 52, which are connected to input terminals 44 and 45 of beam guidance coupler 35 by conductors 497 and 498.

The input circuit for amplifier 295 may be traced from input terminal 296 through resistors 294, 293 and 291, ground connections 501 and 502, resistance element 301 of voltage divider 302, and conductor 503 to terminal 297 of the amplifier. By this circuit there is impressed on the amplifier the series sum of three voltages, the unbalance voltage of bridge 318, which appears across resistor 293, the input voltage on terminals 44 and 45, which appears across resistor 291, and the output voltage of velocity generator 300, which appears across winding 301. If the sum of these three voltages is zero, amplifier 295 supplies no output and motor 298 remains stationary.

When there is no signal on terminals 44 and 45, the voltage across resistor 291 is zero. The bridge output voltage is zero when sliders 314 and 322 divide their windings in the same proportion, which of course is not necessarily equality. The velocity generator voltage is zero when motor 298 is stationary: this voltage is an antihunt voltage as is well known in the art. It is desired that the output from slider 305 be zero when the input on terminals 44 and 45 is zero. This is accomplished by maintaining the input zero and adjusting slider 322 to supply a bridge output signal and cause operation of motor 298 until the output of voltage divider 306 and the bridge output are zero at the same time. This also is an initial setting, and results in an initial condition of bridge 318 in which both sliders 314 and 322 are displaced from the centers of their respective windings: if the windings are linear the displacements are equal.

If at the time relay 80 operates, the output voltage dividers adjusted by motors 298 and 340 happen to be displaced from their zero output positions as defined above, bridge unbalance signals result which energize the motors to correct the slider settings and simultaneously reduce the bridge signals to zero. The initial presence of any such zero signals has no effect on the automatic pilot because of switching circuits presently to be described.

Turning now to directional stabilization coupler 85, it will be evident that primary winding 391 of transformer 390, Figure 2, is connected through conductors 503 and 504, relay contacts 94a and 94b, relay contacts 94d and 94e, and conductors 505 and 506 to terminals 56 and 55 of bearing deviation indicator 132. As is more fully explained in copending application Ser. No. 324,465 referred to above, alternating voltage is supplied on conductors 505 and 506 which varies in amplitude with the angular disparity between the heading of the craft sensed by flux valve 144 and that selected by operation of knob 64 and shown by indicator 73, and which reverses in phase with reversal in the sense of that disparity. The secondary voltage is converted to D. C. by demodulator 393 and filter 394, one terminal 507 of which is grounded at 510 through conductor 511. The other terminal 512 of filter 394 is connected through conductor 513, relay contacts 117g and 117h, conductor 514, relay contacts 114h and 114g, and conductor 515 to one end of resistance element 417, the circuit being completed through ground connections 516 and 510 and conductor 511. Slider 418 is connected through conductor 517, relay contacts 117e and 117d, conductors 520 and 521, resistor 421, conductor 522, resistor 422, and conductor 523 to input terminal 445 of amplifier 444, the circuit being completed through ground connections 516 and 524 to terminal 446 of the amplifier. However, since conductor 520 is grounded at 525 through the relay contacts 114e and 114d, no signal from slider 418 reaches amplifier 444.

A circuit may be traced in the lower right corner of Figure 2 from slider 441 through conductors 526, 520, and 521, resistor 421, conductors 522 and 527, relay contacts 117b and 117a, conductors 530, 531, and 532, slider 432, the portion of resistance element 431 above the slider, and conductor 533 to slider 442; capacitor 427 is connected between conductors 531 and 532 and ground at 534 to filter out high frequency transients. When bridge 433 is unbalanced a voltage drop appears across resistor 421, and comprises an input for amplifier 444. Operation of motor 450 results, adjusting slider 441 to reduce the bridge unbalance voltage to zero, and simultaneously adjusting slider 452. The initial setting of this circuit is accomplished by adjusting slider 442 by means of knob 443 to supply a bridge output signal and cause operation of motor 450 until the output of voltage divider 453 and the bridge output are zero at the same time.

*Omnibearing operation*

Now suppose the craft enters the service area of an omnibearing transmitter, so that a reliable signal is received. An azimuth flag signal appears on cable 136 and flag 75 is withdrawn to indicate the azimuth portion of the apparatus may be relied upon. The flag signal is carried through cable 57 to amplifier 58, and causes energization of relay winding 81z.

A signal is also supplied on cable 137 whose magnitude and polarity are determined by the amount and sense of the displacement of the craft from a line through the transmitter having the bearing shown by indicator 73. Pointer 66 is displaced to the left or right accordingly. The human pilot now turns the knob 64 until pointer 66 returns to its central zero position; the reading of indicator 73 identifies the "radial" from the transmitter which passes through the craft. It is now possible for the human pilot to initiate movement of the craft along that radial, or along any other radial he may choose to select by operation of knob 64. This is done as follows.

Since the rudder chanel 151 of automatic pilot 16 is engaged, voltage appears on terminal 33, Figure 3, and a circuit may be traced in Figure 1 from terminal 33 through conductors 535 and 536, reset switch 105, conductors 537, 540, 541, 542, 543, and 544, relay contacts 81c and 81a which are now in engagement, conductor 545 and relay winding 111z to ground connection 546, and relay 111 pulls in. A further circuit may now be traced from reset switch 105 through conductors 537 and 547, relay contacts 107d and 107e, conductors 550 and 551, relay contacts 111d and 111f, and switch solenoid 84z to ground connection 552. Relay contacts 111a and 111b open the energizing circuit for lamp 102.

Energization of solenoid 84z releases the lock on switch 84, so that it can be operated and will thereafter remain so as long as the solenoid is energized, unless manually released. In normal operation of the system, the human pilot now actuates switch 84 into its operated condition. A circuit can now be traced from reset switch 105 through conductors 537, 540, 553, 554, 555, 556, and 557 to relay contacts 84g and 84i which are now closed. A first circuit is thereby completed through relay winding 110z to ground connection 560; a second circuit is completed through conductors 561 and 562, and relay contacts 106k and 106j to Beam Guidance On lamp 101, the circuit being completed through ground connection 563; a third circuit is completed through conductors 561 and 564, relay contacts 113g and 113h, relay winding 114z and ground connection 565; and a final circuit is completed through conductor 561 and 564, relay winding 122z, and ground connection 566. Relays 110, 114, and 122 pull in, and lamp 101 is illuminated.

When relay 110 pulls in it completes a first circuit which may be traced in Figure 1, from reset switch 105 through conductors 537, 540, 553, 554, and 555, relay contacts 110m and 110j, and conductors 566 and 567, to relay winding 107z, the circuit being completed through ground connection 570. Relay 107 pulls in, completing its own holding circuit from reset switch 105 through conductors 537, 547 and 571, relay contacts 107d and 107f now closed, and conductor 572. Thus winding 107z remains energized even if relay 110 is deenergized.

When relay 110 pulls in it also completes another circuit which may be traced from reset switch 105 through conductors 537, 540, and 553, relay contacts 110i and 110g, and conductor 573 to terminal 24, the circuit being completed through ground connection 574 of Figure 3, thus energizing directional arm lock 220 of directional gyroscope 217, and preventing any subsequent adjustment of sliders 215 and 250. The normal connection whereby directional arm lock 220 is operated from turn control knob 267 is not shown, but is suggested by conductor 575. At no time in the beam guidance procedure is the directional gyroscope of the automatic pilot operative to adjust its sliders.

After operation of relays 107 and 110, the former circuit for solenoid winding 84z from reset switch 105 is interrupted at relay contacts 107d and 107e, but an alternative solenoid energizing circuit may be traced, in Figure 1, through conductors 537, 540, 553, and 554, relay contacts 110f and 110d, conductors 576 and 551, and relay contacts 111d and 111f. Thus upon deenergization of relay 110, solenoid 84 also becomes deenergized.

Ordinarily the human pilot adjusts knob 64, at the same time he operates switch 61, to bring indicator 66 back to its central position, thus selecting the radial the craft happens to be on as the one to be followed to the station. In this case, the signal on conductors 493 and 494 is zero at the moment knob 64 is thus adjusted, and if the craft is moving along the selected radial the signal remains zero. This is an unlikely situation, however; the craft's movement ordinarily has a component perpendicular to the desired radial, and this movement results in an increasing signal on cable 137, whose magnitude and sense depend upon the amount and direction of departure of the craft from the selected radial. This signal actuates indicator 66, and is also transmitted through conductors 493 and 494 to input terminals 46 and 47 of beam guidance coupler 35. High frequency and transient noise components are removed from the signal by capacitor 324, so that only the low frequency component, determined by the movement of the craft with respect to this selected radial, appears across resistor 325 at the input to rate network 326.

Relay 122 is energized as explained above, thus opening the contacts 122j and 122k; relays 116 and 121 remain in their normal condition as shown. Terminal 47 of coupler 21 is connected through conductors 577, 580, and 581 to ground connection 495. The output of network 326 is taken across resistor 331, one end of which is grounded and the other end of which is connected by conductor 582 to resistor 335. Rate network 326 comprises, in this configuration of the apparatus, a shunt branch including resistor 331 and a series branch including a resistance and a capacitance in parallel, the resistance being the series combination of resistor 327 with the parallel combination of resistors 330 and 332.

Network 326 operates to supply across resistor 331 a voltage to ground determined in part by the actual magnitude of the voltage at input terminals 46 and 47 and in part by the rate of change of that voltage. The input for amplifier 337 now includes the series sum of the voltages across resistors 331 and 335, the latter being zero: motor 340 operates to make the bridge voltage equal and opposite to the network voltage, adjusting voltage dividers 354 and 357 at the same time. An output voltage appears between slider 356 and center tap 370, causing current in a circuit which may be traced from slider 356 through conductors 583 and 584, resistance element 384, and conductors 585 and 586 to center tap 370, so that a portion of the voltage between slider 356 and center tap 370 appears between slider 385 and the upper end of resistance element 384.

At the same time that the above operation is occurring, a voltage determined in phase and amplitude by the sense and amount of the angular disparity between the selected radial and the heading of the craft, as opposed to its position relative to the beam, appears on conductors 505 and 506 and is impressed on input terminals 86 and 87 of directional stabilization coupler 85. After passing through isolation transformer 390 it is converted to unidirectional current of the appropriate polarity by demodulator 393 and filter 394. Since relay 114 is now energized, the previously traced circuit from terminal 512 now includes capacitor 415 which combines with resistance element 417 to make up high-pass filter network 414. The signal between slider 418 and ground now has no steady state component, but is influenced if the amplitude of the signal supplied to transformer 390 changes. Contacts 114d and 114e are now open, ungrounding conductor 520 so that the voltage on slider 418 is transmitted to amplifier 444 and results in operation of motor 450 to adjust slider 441. This continues until the voltage drop across resistor 421 due to unbalance of bridge 433 is equal and opposite to the voltage on slider 418, thus reducing the input to amplifier 444 to zero. At the same time slider 452 is displaced from the center of resistance element 454, and the voltage between the slider and center tap 460 is impressed across resistance element 462 of voltage divider 463 through conductors 587 and 588, the latter being connected by conductor 589 to terminal 93 and ground connection 590. A portion of the voltage across resistance element 462 determined by the setting of slider 464 is transmitted through relay contacts 114m and 114j which are now closed, and conductor 591, to terminal 92, thus appearing across output resistor 461.

In addition to the circuits completed in Figure 1, operation of switch 84 is effective, as shown at the right of Figure 3, to open the circuit between slider 252 and slider 266 and complete a circuit from slider 252 through conductor 481, terminal 27, conductors 482 and 592, switch contacts 84f and 84d which are now closed, terminal 40, conductors 593 and 594, the portion of resistance element 384 above slider 385, the slider, conductor 595, relay contact 116e and 116d, conductor 596, relay contact 113b and 113a, conductors 597 and 598, relay contacts 122c and 122a which are now closed, conductors 600 and 601, terminal 41, conductor 602, terminal 92, load resistor 461, conductor 589, and terminal 93 to ground connection 590.

The voltage appearing in the circuit just traced between terminal 27 of automatic pilot 16 and ground is the series sum of the voltage across resistor 461 and the voltage across the portion of resistance element 384 above slider 385, and is effective in the inputs of amplifiers 223 and 257. Motors 187 and 224 operate to adjust sliders 191 and 227, changing the balance of bridges 203 and 241 by amounts proportional and opposite to the signal appearing at terminal 40. These changes are followed by changes in attitude of the craft. A signal determined by the rate of change of craft heading is produced in bridge 221 by adjustment of slider 211 which is connected to the yaw rate gyroscope, as before stated. A signal determined by the roll of the craft is produced in bridge 255 by adjustment of slider 253 by the roll axis of the vertical gyroscope, not shown, as previously mentioned: the whole of this signal is effective in aileron channel 152, but only a part of it determined by the position of slider 262 is effective in rudder channel 151. These bridge unbalance signals are of the same sense as the signals put in by motor adjustment of sliders 191 and 227, and energize the aileron and rudder channels in the opposite sense, allowing the motors to streamline the control surfaces. This operation of the automatic pilot per se is well known, as is also the operation of the elevator channel of the automatic pilot in response to a signal put in by slider 176 when the craft rolls.

The control surface movements just described have the immediate effect of changing the heading of the craft and the subsequent effect of changing its position relative to the selected radial. The former effect changes the signal supplied from terminals 55 and 56 of bearing deviation indicator 132 to the directional stabilization coupler, and the latter effect changes the signal supplied at terminals 53 and 54 of the bearing deviation indicator to the azimuth channel of the beam guidance coupler. The balance slider settings are no longer those resulting in bridge output voltages equal and opposite to the input voltages, and renewed operation of motors 340 and 450 takes place, simultaneously rebalancing the amplifier inputs to zero and modifying the signals in the automatic pilot. The result of this is that the craft approaches and settles down in the desired radial.

If the craft tends to move off the desired path, suitable correcting signals appear on conductors 493 and 494; if its heading tends to change, this is sensed by gyrosyn compass 146 and a signal appears on conductors 505 and 506, so that both the aileron and the rudder channels of the automatic pilot are modified while the change is taking place, the latter modification being in addition to that introduced by normal operation of the yaw rate gyro on slider 211. The time constant of capacitor 415 and resistance element 417 is long enough to give substantial temporary effect to the signal on conductors 505 and 506, while at the same time removing any constant effect, so that regardness of what angular difference between the heading of the craft and the direction of the selected radial is called for by the cross-wind, no permanent signal due to this angular difference is effective in the automatic pilot. It will be apparent therefore that the present invention imparts to the automatic pilot the desirable features of gyro stabilization, while at the same time allowing such stabilization in any necessary direction rather than in a single direction.

If in the configuration of the apparatus just described the radio signal should fail, as for example by reason of failure of omnibearing transmitter, the signals become zero in cables 136 and 137, and relay 81 drops out. Contacts 81c and 81a open to deenergize relay winding 111z, contacts 111d and 111f thereupon open to deenergize switch solenoid 84z, and the switch opens. Lamp 101 is deenergized at switch contacts 84g and 84i. Relay windings 122z, 110z and 114z are deenergized and their contacts drop out. Relay 107 remains energized through its holding circuit, and a further circuit may be traced from reset switch 105 through conductors 537, 547, 571, relay contacts 107d and 107f, conductor 572, relay contacts 107c and 107a which are now closed, relay contacts 111b and 111a, and relay contacts 106h and 106g, to lamp 102, the circuit being completed through ground connection 603.

Because of the construction of switch 84 it is impossible, by operation of the manual button, for the human pilot to reengage the switch while the solenoid is not energized. Moreover, if the radio signal should return relay 81 may be energized and may energize relay winding 111z through contacts 81c and 81a as before, but relay 111 cannot energize switch solenoid 84z through contacts 111d and 111f because the former is cut off from reset switch 105 by relay contacts 110d and 110f and relay contacts 107d and 107e, which are now open. The normal automatic pilot configuration has been restored, and beam guidance cannot again be established until reset switch 105 is operated. This interrupts the energization of relay winding 107z, and the relay drops out, so that contacts 107d and 107e engage, and also so that contacts 107c and 107a disengage turning off lamp 102. It is now possible if desired to reestablish beam guidance by the same steps previously outlined.

The failure of the radio signal may be due to other causes than transmitter failure. One such cause may be the action of the human pilot in tuning the receiver to a different omnibearing transmitter frequency or to an ILS frequency. The turning arrangement and frequency assignment are such that when receiver 130 is tuned to the frequency of a localizer transmitter, receiver 131 is simultaneously tuned to the frequency of the associated glide slope transmitter. Whenever frequency control 62 is set to a frequency in the ILS range, terminal 77 is energized from source 20. Relay 80 is energized whenever the receiver is turned on, regardless of the frequency to which it is tuned. After having adjusted the receiver tuning and operated reset switch 105, the human pilot may reestablish beam guidance, this time based on a localizer transmitter, if the craft is within the service area of the transmitter so that relay 81 pulls in relay 111, energizing switch solenoid 84z as described above.

Localizer following

When the human pilot operates switch 84 in this configuration of the apparatus, relays 110, 107, and 122 pull in as before. This time, however, when relay contacts 122d and 122f of Figure 1 close, terminal 77 has been energized from source 20, and circuits may be traced through conductors 604 and 605 to relay winding 116z, further through conductor 606 to relay winding 94z, and further through conductors 607 and 610 and relay contacts 83g and 83h to relay winding 113z, the circuits being completed through ground connections 611, 612, and 613, respectively: relays 116 and 113 accordingly pull in.

Energization of relay 113 prevents energization of relay 114 by opening relay contacts 113g and 113h. Lamp 101 is relighted as described above.

In Figure 2 a signal on conductors 493 and 494 varies with the displacement of the craft from the center of the localizer beam. Rate network 326 is given a different characteristic, since relay contacts 116a and 116b are now open and no resistor is connected in parallel with resistor 330; the series resistance of the network is greatest in this configuration. The apparatus operates as described above to modify the input at terminals 46 and 47 in accordance with its rate of change, but in a different proportion, and to balance the resulting voltage by voltage from sliders 342 and 350; sliders 353 and 356 in Figure 3 are positioned at the same time.

Energization of relay 94 acts through relay contacts 94a, 94b, 94c, 94d, 94e, and 94f to disconnect terminals 86 and 87 of directional stabilization coupler 85 from conductors 505 and 506, and to connect them instead in a circuit which may be traced from terminal 86 through conductors 503 and 614, relay contacts 94a and 94c, and conductor 615 to automatic pilot terminal 32, which is connected by conductor 616 to center tap 284 of transformer 282. The circuit is completed from slider 276 through terminal 31, relay contacts 94f and 94d, and conductor 504 to terminal 86. The signal supplied to directional stabilization coupler 85 in this configuration of the apparatus is thus proportional to the bank angle of the craft, but since relay 114 is not energized, slider 418 is grounded at 525 and no signal from slider 276 can be effective on motor 450, which simply centers sliders 441 and 452 as previously described.

In this configuration of the apparatus the circuit from terminal 27 of the automatic pilot in Figure 3 may be traced through conductors 482 and 592, switch contacts 84f and 84d, terminal 40, conductors 593, 594, and 584, the portion of winding 380 above slider 381, the slider, conductor 617, relay contacts 113c and 113a now closed, conductor 598, relay contacts 122c and 122a, now closed, conductors 600 and 601, output terminal 41, conductor 602, terminal 92, conductor 591, relay contacts 114j and 114k and conductors 588 and 589 to terminal 93 and ground connection 590.

It will be evident that in this configuration of the apparatus the automatic pilot is modified by the addition of only one signal, at voltage divided 378, which varies with the displacement of the craft from the localizer beam, and that the automatic pilot operates in response to this signal as described above. The difference between this configuration and the one previously described is that there is no signal here responsive to change in the heading of the craft; it has been found that the process of bracketing and settling down on a localizer beam has not necessitated this refinement.

If the localizer signal fails in this configuration of the apparatus, relay 81 drops out. This deenergizes relay 111 which in turn interrupts the energization of switch solenoid 84z, and the switch opens. As a result lamp 101 is deenergized and lamp 102 is energized as explained above, and relays 110, 122, 116, 94 and 113 drop out; relay 107 remains held in by its holding circuit. The craft is again restored to normal automatic pilot control, and beam guidance control can be reestablished by operation of reset switch 105 to release relay 107 and then, when the localizer signal returns, and relays 81 and 111 are again actuated, by once more closing switch 84.

Glide path following

The localizer or azimuth control portion of the apparatus has thus far been considered independent of the glide path or elevation control portion. In fact, both are energized at the same time, and are tuned to the same station when tuning knob 62 is operated, if the pilot tunes from an omnibearing frequency to an instrument landing frequency. It will be recalled that this change in tuning causes switch 84 to drop out: at the same time that changes in the azimuth channel are happening as described previously, the following changes occur in the elevator channel. It is understood of course that at the time the change in tuning is made the craft is in the service area of both the localizer and the glide path transmitters, and is normally in level flight below the center of the sloping glide path beam and moving toward it.

Receiver 131 and coupler 35 are energized and a "fly-up" signal appears in cable 141, displacing index 67 upwardly and supplying a signal on conductors 497 and 498 to input terminals 44 and 45 of the elevation control channel of coupler 35. Transients on this signal are filtered out by capacitor 290: the signal itself is opposed by the voltage drop in resistor 293 and the difference supplied between terminals 296 and 297 of amplifier 295. Operation of motor 298 follows to adjust slider 314 until the input to amplifier 295 becomes zero, and at the same time adjusts slider 305 on winding 307 and displaces contact 97 out of engagement with contact 98.

The glide path receiver also supplies a signal on cable 142 sufficient to operate flag 74, and also, through cable 57, to operate relay 82. This in turn energizes a circuit which may be traced from reset switch 105 through conductors 537, 540, 541, 542 and 543, relay contacts 82c and 82a and glide flag relay winding 112z to ground connection 618. This relay operates its contacts, but since relay 122 is not now energized no system changes take place.

Continued movement of the craft causes index 67 to move toward its central position as the craft approaches the center of the beam, and motor 298 drives sliders 305 and 314 and contact 97 accordingly. When index 67 is centered, the craft is on the center of the beam, sliders 314 and 322 are aligned, but displaced from the centers of their windings, and slider 305 is also displaced from the center of its winding so that no voltage appears between it and center tap 313: and contact 97 simultaneously engages contact 98. A circuit may now be traced from reset switch 105 through conductors 537, 540, 541, and 542, relay contacts 112g and 112i now closed, conductor 619, glide reset relay winding 83z, conductors 620 and 621, contacts 98 and 97 to ground connection 622, and relay 83 pulls in, completing its own holding circuit through contacts 83f and 83d to ground connection 608, so that if contacts 97 and 98 disengage the relay does not drop out. This influences the circuit in the lower left portion of Figure 1 energizing relay 113 from conductor 610, by opening relay contacts 83g and 83h, and relay 113 drops out. Relay contacts 113g and 113h in the central part of Figure 1 complete the energizing circuit for relay 114, which pulls in. A circuit is now completed in the lower left corner of Figure 1 from conductor 607 through relay contacts 114c and 114a now closed, conductor 623, and relay winding 117z to ground connection 624, and relay 117 pulls in.

Relay 83 completes at contacts 83j and 83m a holding circuit between conductor 542 and conductor 619, so that if relay 112 drops out, relay 83 remains energized. In the lower left corner of Figure 1 relay 83 operates to complete a circuit from conductor 610 through conductor 626, relay contacts 83g and 83i, conductors 627, 630, 631, and 632, switch contacts 112a and 112c now closed, conductor 633, relay contacts 106e and 106d, conductors 634 and 635, and lamp 103 to ground connection 636. A further circuit may be traced from conductor 631 through conductor 638 and relay winding 121z to ground connection 639; relay 121 accordingly pulls in also.

The relay operations just described result in changes in both couplers. In coupler 35, in rate network 326, closure of relay contacts 121c and 121a connects resistor 333 in parallel with resistor 330, thus reducing the total resistance in parallel with capacitor 334. By reason of operation of relay 116 the circuit between output terminals 40 and 41 is modified so that it now extends through conductors 593, 594, 584, 583, 640 and 641, the portion of resistance element 375 to the left of slider 376, the slider, conductor 642, relay contacts 116f and 116d now closed, conductors 643 and 596, relay contacts 113b and 113a, conductors 597 and 598, relay contacts 122c and 122a, and conductors 600 and 601. Resistance element 375 is connected to slider 353 by conductors 641 and 644 and to center tap 364 by conductor 645, so that the output to the automatic pilot from the azimuth channel of coupler 35 is determined by the voltage on secondary winding 361, the displacement of slider 353 from its central position, and the setting of slider 376. Secondary winding 361 gives a smaller voltage output than secondary winding 365.

An interconnection between couplers 35 and 85 is made effective in the automatic pilot for the first time when glide path control of the craft becomes effective. In Figure 3 the primary winding 372 of transformer 371 in coupler 35 is energized through a circuit which may be traced from slider 353 to voltage divider 354 through conductors 644, 641 and 646, winding 372, conductors 647 and 645 to center tap 364. Secondary winding 373 is connected to output terminals 42 and 43. Terminal 43 is connected to input terminal 91 of coupler 85 through conductors 650 and 651. Terminal 42 is connected to input terminal 90 of coupler 85, when the craft is under glide path control, through conductor 652, relay contacts 113e and 113d, conductor 653, relay contacts 122i and 122g now closed, and conductors 654 and 655. When the beam guidance apparatus is not in operation, relay 122 is not energized: input terminals 90 and 91 are short circuited through conductors 651 and 655 and relay contacts 122g and 122h; and the short circuit is prevented from being a load reflected back through transformer 371 on voltage divider 354 by the opening of relay contacts 122g and 122i.

When the craft takes the configuration for following a localizer beam, relay 122 is energized to remove the short circuit across terminals 90 and 91 and to complete the circuit across relay contacts 122g and 122i, but relay 113 is also deenergized, so the interconnecting circuit traced above is interrupted at relay contacts 113d and 113e. Input terminals 90 and 91 now have no voltage applied to them, and no voltage is impressed by conductors 661 and 662 across the input resistor 407 of rate network 406.

The output of network 406 is to appear across output resistor 410, one end of which is grounded by conductors 663, 662, and 660, and comprises the envelope of the alternating voltage supplied to terminals 90 and 91 modified by its rate of change. This output is to be taken off on conductor 664, but in the omnibearing configuration of the apparatus relay contacts 117f and 117d are open because, although relay 114 is energized, terminal 77 is not, and so no electrical energy is available for winding 117z. In the localizer configuration of the apparatus terminal 77 is energized, but energization of relay 113 disables relay 114 so that again relay 117 is deenergized and conductor 664 is cut off from the rest of coupler 85 at relay contacts 117d and 117f.

However, as a result of relay operation following upon engagement between contacts 97 and 98 relay 117 is energized, connecting conductor 664 to slider 441. At the same time relay contacts 117g and 117h open, interrupting the normal circuit from demodulator output terminal 512 to voltage divider 416, and a new circuit is complete from conductor 513 through conductor 665, relay contacts 117g and 117i, conductor 666, and summing resistor 413 to the upper terminal of output resistor 410. The input to terminals 86 and 87 of coupler 85 is still supplied by voltage divider 277 in accordance with roll of the craft, and after demodulation and filtering is transmitted through the circuit just traced. There thus appear across resistor 410 both the output of demodulator 397, modified by rate network 406, and the unmodified output of demodulator 393, and the input to amplifier 444 is now the series sum of the voltages across resistors 421 and 410. Contacts 117d and 117e open at the same time to prevent the portion of winding 417 below slider 418 from loading down the balancing component of coupler 85.

The voltage at the upper end of resistor 410 is connected to slider 441 through conductor 664 and relay contacts 117f and 117d, and is the only signal which requires balancing by operation of motor 450: this accordingly takes place. The balancing network has been changed however by operation of relay 117 so that the circuit from slider 442 now extends through conductors 533 and 667, relay contacts 117c and 117a now closed, conductor 530 and capacitor 426, to resistor 422.

The input to amplifier 444 is the series sum of the voltage across resistor 410 and that across resistor 421. Because of capacitor 426, the latter voltage can exist only when the voltage between sliders 441 and 442 is changing, that is, when slider 441 is moving, because any constant component of the signal voltage is blocked by the capacitor. This means that as long as a signal appears across resistor 410, motor 450 operates to adjust slider 441 at a rate which is sufficient to give a charging current in resistor 421 which produces a voltage drop in the resistor equal to the voltage on resistor 410. This rate is thus determined by the magnitude of the signal on resistor 410, and slider 452 is adjusted at the same rate. The extent to which slider 452 moves, and hence the voltage supplied by coupler 85 at terminals 92 and 93, is thus measured by the speed of motor 450 and the length of time it operates, and is therefore the integral of the signal on resistor 410 within the limits of a resistance-capacitance network as an integrator. This type of operation is particularly advantageous in the present application because of the well known aerodynamic principle that heading is the integral of roll: the arrangement thus provides a substitute for the directional gyroscope without giving a steady state signal if the heading of the craft changes permanently, as may be necessary with changing crosswind components during the final glide. The addition of the output of the azimuth channel of the coupler, supplied through slider 404 before integration, gives system operation equivalent to precessing a directional gyroscope in accordance with the positional error of the craft: this makes allowance automatically for the changing crosswind components referred to above.

In the elevation channel of beam guidance coupler 35, as shown in Figure 3, energization of relay 83 disconnects slider 182 from ground connection 475 by opening relay contacts 83a and 83b and completes a circuit which may be traced from slider 182 through conductor 472, terminal 25, conductors 473 and 670, relay contacts 83a and 83c, terminal 36, conductors 671 and 672, slider 305, center tap 313, conductor 673, slider 303, the portion of resistance element 301 below the slider, to ground connection 502. When relay 121 pulls in a connection from conductor 672 through relay contacts 121e and 121d to ground at 684 is opened so that any coupler voltage between slider 305 and ground may appear on slider 182 in the automatic pilot. In addition to the antihunt signal supplied to amplifier 295, velocity generator 274 maintains a voltage between slider 303 and center tap 313 which is determined by the speed of motor 298. Operation of the motor is governed by the signal on input terminals 44 and 45, which varies with displacement of the craft from the center of the glide slope beam. Transients are removed from this signal by capacitor 290, and the signal appears across resistor 291. Relay contacts 121h and 121g are now open, so that the circuit from slider 314 to slider 322 includes capacitor 292 as well as resistor 293, and a reset system generally similar to that in the directional stabilization coupler is created. A basic distinction between the two networks is to be found, however, in the fact that in the normal condition of the latter sliders 441, 442, and 452 are all centered, while in the normal condition of the former sliders 314, 322, are displaced from their centers by 2½ airplane degrees. At the time when capacitor 415 in coupler 85 is unshorted the craft has the azimuth it must thereafter follow, except for changing crosswind components: at the time when capacitor 292 in coupler 35 is unshorted the craft's pitch attitude differs by about 2½ degrees from that which it must settle down on. Accordingly while the net charge on capacitor 415 may be expected to be generally zero, that on capacitor 292 may be expected to be the voltage equivalent of 2½ airplane pitch degrees. The circuit in coupler 85 is a simple condenser reset circuit, while that in coupler 35 is one in which the same elements are differently arranged to create and maintain a permanent displacement in the output signal, while the input signal to amplifier 295 is maintained zero: the input signal required to establish the permanent output signal is stored in capacitor 392 and does not thereafter affect the input to amplifier 295. The arangement described has the advantage of allowing sliders 305 and 314 to operate about the centers of their windings during the glide.

If the glide slope signal fails, after full beam guidance control of the craft in azimuth and elevation has been established, relay 82 in Figure 1 is deenergized, allowing relay 112 to drop out. The circuit to lamp 103 is interrupted at contacts 112a and 112c and a new circuit is completed from conductor 638 through conductor 671, relay contacts 112a and 112b, conductor 672, relay contacts 106b and 106a, conductors 673 and 674, and lamp 104 to ground connection 675: lamp 103 is accordingly extinguished and lamp 104 lighted. Relay contacts 112g and 112i open, but the circuit to relay winding 83z is still completed through relay contacts 83j and 83m. A circuit may be traced from conductor 627 through relay contacts 112d and 112e, now closed, conductor 676, and relay winding 120z to ground connection 677, and glide failure relay 120 pulls in, completing its own holding circuit through conductor 680 and relay contacts 120f and 120d to conductor 630.

A further circuit may now be traced from conductor 604 through relay contacts 120c and 120a, conductor 681, relay winding 115z and ground connection 682: pitch lock relay 115 accordingly pulls in. The circuit energizing the line phase winding of motor 298 with alternating voltage through capacitor 123 is interrupted at contacts 115b and 115a, and a new circuit may be traced energizing the winding with direct voltage from conductor 604 through relay contacts 120c and 120a, conductors 681 and 683, relay contacts 115c and 115a and conductor 684. This energization acts as a dynamic brake on motor 298, and holds sliders 305 and 314 in their present position.

From the foregoing it will be evident that the failure of the glide slope signal has no effect in the azimuth control portion of the over-all system, and that in the elevation control portion its effect is to prevent further operation of motor 298 and hold slider 305 in its present position. The craft accordingly proceeds to follow the localizer beam at the last pitch attitude called for by motor 298.

If the glide slope signal returns, relay 82 and thus relay 112 pull in. The lamp 104 goes out, and the lamp 103 goes on, through circuits previously explained. Relay 120 cannot drop out, however, because of its holding circuit, so no further change in the apparatus takes place. If elevator control from the glide slope receiver is desired, it is necessary to push reset button 105, thus shutting off the entire system, and then reengage the system again, since relay 120 can be released only by deenergization of relay 83 or relay 122 controlled thereby. This arrangement is used because when a craft is gliding under control of the glide slope receiver it is very near the ground and moving very slowly. It is safer under these conditions to control at the last called for pitch attitude than to permit sudden reestablishment of elevation control, because transient signals might reach the autopilot to cause dangerous control surface movements. Moreover, if the glide slope signal returns, as indicated by lamps 103, and 104, the human pilot can always disengage the elevator channel of the automatic pilot by means of switch 23, and manually control the craft to follow index 67 for the few seconds remaining until touchdown.

If the localizer signal only fails, after complete beam guidance control in azimuth and elevation has been established, relay 81 drops out, deenergizing relay winding 111z at contacts 81c and 81a. Contacts 111d and 111f disengage, deenergizing solenoid winding 84z of the solenoid switch. Relays 110, 114, and 122 are deenergized, and with the latter relays 94, 116, 117 and 121. Relays 82, 83, 107 and 112 remain energized. Lamp 101 is deenergized at relay contacts 84g and 84i, and lamp 102 is energized at relay contacts 111b and 111a, as previously described. Lamp 103 remains energized. It will be seen that switch contacts 84b and 84a restore normal autopilot rudder and aileron channel operation, while normal elevator channel operation is completed through relay contacts 83a and 83c now closed, terminal 36, conductor 671, relay contacts 121e and 121d, and ground connection 684. Directional arm lock 220 is deenergized at relay contacts 110i and 110g. The craft is thus restored to the condition of flight which it had before beam guidance was initiated, except that its present heading is now maintained because the directional gyroscope was overpowered during any turns made in the meantime.

If the localizer signal returns, relay 81 and hence relay 111 are energized, but energization of switch solenoid 84z is interrupted at relay contacts 107d and 107e now open, so that beam guidance control cannot be reestablished until reset switch 105 is operated to deenergize relay 107 and incidentally relay 83. This mode of operation is provided because there is no way of telling how long a localizer signal interruption may continue, and the craft might be in a position at the time the signal returned in which automatic restoration of beam guidance control would cause dangerous control surface movements.

Since considerable reliance is placed on lamps 101, 102, 103, and 104 it is desirable to be able to check their operation, to ensure that an unlighted lamp is not actually burned out. To provide for this switch contacts 106a, 106d, 106g and 106j may be moved simultaneously out of engagement with fixed contacts 106b, 106e, 106h and 106k and into engagement with fixed contacts 106c, 106f, 106i and 106m. The latter contacts are continuously energized from terminal 33 through conductors 535, 685, 686, 687 and 690 so that lamps 101, 102, 103 and 104 are disconnected from their normal energizing circuits and connected to terminal 33. All lamps are now lighted and this result indicates the satisfactory condition of the lamps.

A modification of the invention is shown in Figure 5. This form of the invention is the same as that shown in Figures 1 to 3 except as concerns the portion of Figure 1 from reset switch 105 down: the modification in this portion of the apparatus comprises the specific subject matter of Figure 5. As far as the elements are the same in both figures, they are given the same reference characters. Terminals 33, 34, 24, and 77 of Figure 5 cooperate with like terminals in Figures 2 and 3.

Figure 5 differs from the lower part of Figure 1 only in the following respects. Conductor 541 is disconnected from conductors 540 and 553 and is connected instead to terminal 34: as shown in Figure 3, terminal 34 is energized whenever the elevator channel of the automatic pilot is engaged. Relay contacts 83j and 83m are omitted. Conductor 631 is disconnected from conductor 630 and relay contact 120d and is connected instead to receiver terminal 77. Finally, relay contacts 120a and 120c and relay 115 in its entirety are omitted, winding 95 being connected directly to capacitor 123: this latter change must also be understood as applying to the showing of the same structure in Figure 2.

The operation of this modification of the invention is the same as that described at length above with the exceptions about to be related. In the first place, beam guidance control of the aircraft can only be established if the elevator channel of the autopilot is engaged in addition to the rudder channel: this is accomplished by arranging relay windings 83z, 112z, and 111z for energization from terminal 34, and relay windings 122z, 107z, 110z, and 114z and solenoid winding 84z from terminal 33.

In the second place if the glide slope signal only fails, after complete beam guidance control of the craft in azimuth and elevation is established, the craft is restored to level flight under elevator control of the automatic pilot, with azimuth control from the localizer. This can be understood by observing that deenergization of relay 82 releases relay 112, and this in turn deenergizes relay 83. Lamp 103 is deenergized by relay contacts 112a and 112c and lamp 104 is energized through relay contacts 112a and 112b as before. Relay 121 is continuously energized, but the elevator channel of the automatic pilot is returned to ground at 475 through relay contacts 83a and 83b.

In the last place, if the localizer signal only fails, after complete beam guidance control of the craft in azimuth and elevation is established, glide slope control continues but azimuth control is restored to the automatic pilot, on the heading prevailing at the time the signal failed. This can be understood by observing that deenergization of relay 81 releases relay 111 which in turn deenergizes switch solenoid 84 and therefore relays 110, 114, and 122, and with the latter relays 116, 94, and 117. Release of switch 84 restores the normal turn control circuit of the automatic pilot at switch contacts 84a and 84b of Figure 3, and return of the localizer signal cannot reenergize solenoid 84 since contacts 107d and 107c and contacts 110f and 110d of Figure 5 are both open. However, all the glide slope control relays remain energized either from terminal 34 or from terminal 77, and line phase winding 95 of the pitch motor remains energized from source 17. Accordingly beam guidance control of the pitch attitude of the craft continues unaltered.

The mode of operation taking place in the modification of the invention is preferred by some pilots to that first described: each mode has its advantages, and the selection between them is largely a matter of choice. A particular advantage of the present apparatus as a whole lies in the relative insignificance of the changes required to convert it from one mode of operation to the other.

From the foregoing specification it will be apparent that we have invented a new aircraft control system for regulating the flight of a craft in azimuth and elevation in accordance with either the signal from an omnirange transmitter or the signals from a pair of instrument landing system transmitters. The invention is particularly notable for its safety features, which include the fact that no beam guidance control from any radio signals can take place unless the radio receiver is turned on and unless at least one channel of the automatic pilot is engaged. The system also includes a selector switch which cannot be operated unless adequate azimuth signal is being received, and when the selector switch is operated the directional arm lock in the automatic pilot is energized. If the azimuth signal fails at any time the selector switch drops out and the subsequent return of the azimuth signal produces no change in the system until the latter is reset. The system further includes automatic glide path control initiation when the craft crosses the center of the glide path beam. If after the glide signal assumes control, that signal fails, azimuth control continues in one form of the invention and the last assumed pitch attitude is maintained: in another form of the invention the pitch attitude reverts to that prevailing before glide slope control was established. If after the glide signal assumes control the azimuth signal only fails, both azimuth and glide control of the craft are restored to the automatic pilot in one form of the invention, while in another form of the invention azimuth control is restored to the automatic pilot while glide path control remains in the beam guidance equipment.

Numerous objects and advantages of our invention have been set forth in the foregoing description, together with details of the structure and function of the invention, and the novel features thereof are pointed out in the appended claims. The disclosure, however, is illustrative only, and we may make changes in detail within the principle of the invention to the full extent indicated by the broad general meaning of the terms in which the appended claims are expressed.

We claim as our invention:

1. Aircraft control apparatus comprising, in combination: means supplying electrical energy; an automatic pilot energized therefrom, including an engageable control channel for controlling the attitude of the craft about an axis thereof; beam guidance signal receiving means giving a signal output determined by the position of the craft with respect to a guidance beam; coupling means connected to said receiving means for supplying a control signal adapted to modify the operation of said automatic pilot in accordance with said signal output; first switch means connected to said automatic pilot and to said coupling means, for supplying said control signal to said automatic pilot; operating means in said first switch means; and means connecting said operating means to a point in said automatic pilot which is energized, from said first named means, only when said control channel of said automatic pilot is engaged, said last named means including second switch means and further means connecting said second switch means to said receiving means for rendering said further connecting means operative only when said receiving means is also operative.

2. Aircraft control means comprising, in combination: means supplying electrical energy; an automatic pilot including means for controlling the attitude of a craft about a plurality of axes, and comprising a directional gyroscope having disabling means for preventing operation thereof; beam guidance signal receiving means giving an output whenever a signal is being received; first, manually operable switching means connected to said first named means and said disabling means for causing operation of said disabling means; locking means in said first switching means for normally preventing actuation thereof; solenoid means in said first switching means for disabling said locking means so that said first switching means may be actuated; and relay means connected to said first named means, to said first switching means, and to said receiving means for operation by said output to energize said solenoid means from said first named means.

3. Aircraft control apparatus comprising, in combination: means supplying electrical energy; an automatic pilot including means normally controlling the attitude of a craft about an axis; beam guidance signal receiving means giving an output determined by the position of the craft with respect to a guidance beam; coupling means connected to said receiving means; means for connecting said coupling means to said automatic pilot to modify the operation of said automatic pilot in accordance with said output; means connected to the first named means, to said receiving means, and to said coupling means for preventing operation of said connecting means unless said receiving means is in operation.

4. Aircraft control apparatus comprising, in combination: means supplying electrical energy; an automatic pilot including means normally controlling the attitude of a craft about a plurality of axes; beam guidance signal receiving means giving a pair of outputs determined by the position of the craft with respect to a pair of guidance beams which intersect to define a path to be followed by the craft; first and second coupling means connected to said receiving means; means for connecting said coupling means to said automatic pilot to modify the operation of said automatic pilot in accordance with the respective outputs of said pair; and means connected to the first named means, to said receiving means, and to said coupling means for preventing operation of said connecting means unless said receiving means is in operation.

5. Aircraft control apparatus comprising, in combination: means supplying electrical energy; an automatic pilot comprising means normally controlling the attitude of a craft about a plurality of axes, and including a directional gyroscope having disabling means for preventing said gyroscope from becoming effective in said automatic pilot; beam guidance signal receiving means giving a first output determined by the intelligence component of a radio signal, said component varying with the position of the craft relative to a predetermined path, and giving a second output determined by the strength of said radio signal; coupling means connected to said receiving means for supplying a control output adapted to modify the operation of said automatic pilot in accordance with said first, manually operable output; first switching means connected to said coupling means, to said automatic pilot, and to the first named means for manual operation out of a normal position, in which normal operation of said automatic pilot takes place, into an operated position, in which said control output is supplied to said automatic pilot to modify the operation thereof and in which said disabling means is energized; locking means in said first switching means for normally preventing actuation thereof out of its normal position; solenoid means in said switching means for disabling said locking means, so that said first switching means may be actuated into the operated position thereof, and for overrideably maintaining said first switching means in said operated position; and further switching means connected to said first named means, to said first switching means and to said receiving means for energizing said solenoid means from said first named means.

6. Aircraft control apparatus comprising, in combination: means supplying electrical energy; an automatic pilot comprising means normally controlling the attitude of a craft about an axis, and including a directional gyroscope having disabling means for preventing said gyroscope from becoming effective in said automatic pilot; beam guidance signal receiving means giving an output determined by the intelligence component of a radio signal, said component varying with the position of the craft relative to a predetermined path; coupling means connected to said receiving means for supplying a control output adapted to modify the operation of said automatic pilot in accordance with said output; manually operable switching means connected to said first named means, to said coupling means and to said automatic pilot for supplying said control output to said automatic pilot to modify the operation thereof; and means in said switching means for simultaneously energizing said disabling means from said source.

7. Aircraft control apparatus comprising, in combination: an automatic pilot for controlling the attitude of an aircraft about the pitch axis thereof; a beam guidance receiver giving an elevation error output; a signal source adjustable through a position of zero signal to give signals of opposite sense and variable magnitude; motor means connected to said receiver for positioning in accordance with said output; means connecting said signal source for adjustment by said motor means in such a fashion that when said output is zero, the signal from said source is also zero; means connected to said source and said automatic pilot for operation to supply said signal to said pilot; and means connected to said motor and said last named means for causing operation of said last named means at the same time that said signal becomes zero.

8. Aircraft control apparatus comprising, in combination: a beam guidance receiver giving azimuth error and elevation error outputs in response respectively to first and second radio signals; an automatic pilot having a turn control portion and a pitch control portion; means supplying electrical energy; first and second signal means connecting said last named means to said receiver and to said automatic pilot and normally operating respectively to adjust the energy supplied from said last named means in accordance with said azimuth and elevation error output, to supply signals to said turn and pitch control portions respectively of said automatic pilot which are determined by said outputs; and means connected to said receiver and to said signal means for preventing further operation of said signal means to adjust the energy supplied to said pitch control portion of said automatic pilot if the second radio signal fails.

9. Aircraft control apparatus comprising, in combination: a beam guidance receiver giving azimuth error and elevation error outputs in response respectively to first and second radio signals; an automatic pilot normally stabilizing the attitude of the aircraft and having overridable turn control and pitch control portions; switch means operable to interconnect said receiver and said automatic pilot for overriding said portions in accordance with said outputs, respectively; and means connected to said switch means and to said receiver for restoring normal operation of said turn control portion only of said automatic pilot upon failure of said first radio signal.

10. Aircraft control apparatus comprising, in combination: a beam guidance receiver giving azimuth error and elevation error outputs in response respectively to first and second radio signals; an automatic pilot normally stabilizing the attitude of an aircraft and having overridable turn control and pitch control portions; switching means operable to interconnect said receiver and said automatic pilot for overriding said portions in accordance with said outputs, respectively; and means connected to said switching means and to said receiver for restoring normal operation of both said portions upon failure of the first radio signal, whereupon normal operation of said automatic pilot is resumed.

11. Aircraft control apparatus comprising, in combination: a beam guidance receiver giving azimuth error and elevation error outputs; an automatic pilot normally stabilizing the attitude of an aircraft and having overridable turn control and pitch control portions; means connected to said receiver and said automatic pilot for establishing, in sequence, first azimuth and then elevation override of said pilot in accordance with the respective error outputs; and means in said last named means preventing establishment of pitch control override unless turn control override is already established.

12. Aircraft control apparatus comprising, in combination: a beam guidance receiver giving azimuth error and elevation error outputs in response respectively to first and second radio signals; an automatic pilot having a turn control portion and a pitch control portion; means connecting said receiver to said automatic pilot so as to supply signals to said portions determined by said outputs; and means in said last named means connected to said receiver for restoring said pitch control portion to an initial condition if said second signal fails.

13. Apparatus of the class described comprising, in combination: an airborne radio receiver giving a signal indicative of need for change in the direction of movement of the aircraft; means including a coupler for controlling the aircraft in accordance with said signal, when electrically energized; a source of electrical energy; relay means connected to said source and said coupler for operation to energize said coupler; and means connected to said receiver and said relay means for preventing operation of said relay means except when said receiver is in operation.

14. Aircraft control apparatus comprising, in combination: an automatic pilot for controlling the attitude of an aircraft about at least one axis thereof; a beam guidance receiver giving a pair of outputs; selector switch means connected to said receiver and said pilot for operation to supply to said pilot a signal determined by one of said outputs, said switch means including holding means for normally maintaining operation thereof; and irreversible means connected to said receiver and said selector switch means for disabling said holding means to interrupt the normal operation of said switch means, upon failure of a second of said outputs.

15. Apparatus of the class described comprising, in combination: an automatic pilot for normally controlling the attitude of an aircraft; radio responsive means giving a first output indicative of need for change in the attitude of the craft and a second output which is interrupted if the radio signal fails; relay means connected between said automatic pilot and said radio responsive means for operation to maintain a circuit therebetween for said first output; and means connected to said relay means and to said radio responsive means for interrupting operation of said relay means whenever said second output is interrupted.

16. Apparatus of the class described comprising, in combination: an airborne radio receiver giving an output indicative of the need for change in the direction of movement of an aircraft; apparatus for controlling the aircraft about at least one axis including at least one channel having a point at which an electrical signal appears whenever said channel is in operation; coupling means connected to said receiver for operation to supply a signal determined by the output of said receiver; switching means normally connecting said coupling means to said apparatus so that said signal modifies the operation of said apparatus; and means connected to said point and to said switching means for preventing operation of said switching means except when said signal appears at said point.

17. Apparatus of the class described comprising, in combination: an airborne radio receiver giving an output indicative of the need for change in azimuth in the direction of movement of an aircraft; apparatus for controlling the aircraft about a plurality of axes including at least a rudder channel having a point at which an electrical signal appears whenever said channel is in operation; coupling means connected to said receiver for operation to supply a signal determined by the output of said receiver; switching means normally connecting said coupling means to said apparatus so that said signal modifies the operation of said apparatus; and means connected to said point and to said switching means for preventing operation of said switching means except when said signal appears at said point.

18. Apparatus of the class described comprising, in combination: an airborne receiver giving an output indicative of need for change in azimuth and elevation in the direction of movement of an aircraft; apparatus for controlling the aircraft about a plurality of axes including a rudder channel and an elevator channel each having a point at which an electrical signal appears whenever said channel is in operation; coupling means including lateral and vertical couplers connected to said receiver for operation to supply signals determined by the outputs of said receiver; switching means normally connecting said coupling means to said apparatus so that said signal modifies the operation of said apparatus; and means connected to said points and to said switching means for preventing operation of said lateral coupler except when said signal appears at said point in said rudder channel, and for preventing operation of said vertical coupler except when said signal appears at said point in said rudder channel.

19. Apparatus of the class described, comprising, in combination: an airborne radio receiver giving an output indicative of need for change in elevation in the direction of movement of an aircraft; apparatus for controlling the aircraft about at least one axis including an elevator channel having a point at which an electrical signal appears whenever said channel is in operation; coupling means connected to said receiver for operation to supply a signal determined by the output of said receiver; switching means normally connecting said coupling means to said apparatus so that said signal modifies the operation of said apparatus; and means connected to said point and to said switching means for preventing operation of said switching means except when said signal appears at said point.

References Cited in the file of this patent

UNITED STATES PATENTS

| | | |
|---|---|---|
| 2,611,128 | Pine | Sept. 16, 1952 |
| 2,632,135 | Carpenter | Mar. 17, 1953 |
| 2,665,086 | Moog | Jan. 5, 1954 |